US007445884B2

(12) United States Patent
Yanagisawa

(10) Patent No.: US 7,445,884 B2
(45) Date of Patent: *Nov. 4, 2008

(54) PHOTOTHERMOGRAPHIC MATERIAL, DEVELOPMENT METHOD AND THERMAL DEVELOPMENT DEVICE THEREOF

(75) Inventor: Hiroyuki Yanagisawa, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/143,563

(22) Filed: Jun. 2, 2005

(65) Prior Publication Data

US 2006/0003272 A1 Jan. 5, 2006

(30) Foreign Application Priority Data

Jun. 9, 2004 (JP) ............................ 2004-170869

(51) Int. Cl.
*G03C 5/16* (2006.01)
*G03B 27/32* (2006.01)
*B41J 2/435* (2006.01)

(52) U.S. Cl. ...................... 430/350; 430/619; 347/228; 355/27

(58) Field of Classification Search ................. 430/619, 430/350, 351; 396/571, 572; 347/228; 355/27
See application file for complete search history.

(56) References Cited

U.S. PATENT DOCUMENTS

| | | | |
|---|---|---|---|
| 2,322,037 | A | 6/1943 | Lindquist |
| 3,022,169 | A | 2/1962 | Heckelmann et al. |
| 3,079,257 | A | 2/1963 | Morcher et al. |
| 3,152,904 | A | 10/1964 | Sorensen et al. |
| 3,445,234 | A | 5/1969 | Cescon et al. |
| 3,457,075 | A | 7/1969 | Morgan et al. |
| 3,487,075 | A | 12/1969 | Davis et al. |
| 3,589,903 | A | 6/1971 | Birkeland |
| 3,672,904 | A | 6/1972 | deMauriac |

(Continued)

FOREIGN PATENT DOCUMENTS

JP 2004-004522 A 1/2004

(Continued)

OTHER PUBLICATIONS

Donald H. Klosterboer, "Thermally Processed Silver Systems," *Neblette Eighth Edition*, (1989), pp. 279-291, published by Van Nostrand Reinhold, New York, N.Y.

*Primary Examiner*—Thorl Chea
(74) *Attorney, Agent, or Firm*—Frishauf, Holtz, Goodman & Chick, P.C.

(57) ABSTRACT

A thermal development device including: a thermal development section for heating to develop a latent image formed on a light-sensitive surface of a photothermographic material; a cooling section for cooling the photothermographic material passed the thermal development section under a condition that a cooling rate for a light-insensitive surface of the photothermographic material is faster than the cooling rate for the light-sensitive surface of the photothermographic material; and a conveyance section in which the photothermographic material is conveyed via the thermal development section and the cooling section, and the length of the conveyance path that passes the cooling section is not more than 1.5 times the length of the conveyance path that passes the thermal development section.

12 Claims, 1 Drawing Sheet

U.S. PATENT DOCUMENTS

| | | | |
|---|---|---|---|
| 3,846,136 A | | 11/1974 | Sullivan |
| 3,874,946 A | | 4/1975 | Costa et al. |
| 3,994,732 A | | 11/1976 | Winslow |
| 4,003,749 A | | 1/1977 | Masuda et al. |
| 4,009,039 A | | 2/1977 | Masuda et al. |
| 4,021,249 A | | 5/1977 | Noguchi et al. |
| 4,022,617 A | | 5/1977 | McGuckin |
| 4,123,282 A | | 10/1978 | Winslow |
| 4,368,247 A | | 1/1983 | Fletcher, Jr. et al. |
| 4,452,885 A | | 6/1984 | Nozawa et al. |
| 4,461,681 A | | 7/1984 | Barber |
| 4,515,888 A | | 5/1985 | Beretta et al. |
| 4,536,473 A | | 8/1985 | Mihara |
| 4,546,075 A | | 10/1985 | Kitaguchi et al. |
| 4,639,414 A | | 1/1987 | Sakaguchi |
| 4,740,455 A | | 4/1988 | Kubodera et al. |
| 4,741,966 A | | 5/1988 | Cavezzan |
| 4,751,175 A | | 6/1988 | Aotsuka et al. |
| 4,835,096 A | | 5/1989 | Lea |
| 4,959,294 A | | 9/1990 | Lea et al. |
| 5,028,523 A | | 7/1991 | Skoug |
| 5,244,773 A | | 9/1993 | Muramatsu et al. |
| 5,246,337 A | | 9/1993 | Booster |
| 5,492,805 A | * | 2/1996 | Krepski et al. .............. 430/619 |
| 6,320,642 B1 | * | 11/2001 | Ogawa et al. ................. 355/27 |
| 6,468,720 B1 | * | 10/2002 | Hirabayashi et al. ........ 430/350 |
| 2001/0029000 A1 | * | 10/2001 | Yoshioka et al. ............ 430/607 |
| 2003/0091347 A1 | * | 5/2003 | Goto et al. .................. 396/564 |
| 2004/0038156 A1 | * | 2/2004 | Oyamada et al. ............ 430/350 |

FOREIGN PATENT DOCUMENTS

JP 2004-4522 A 1/2004

* cited by examiner

PHOTOTHERMOGRAPHIC MATERIAL, DEVELOPMENT METHOD AND THERMAL DEVELOPMENT DEVICE THEREOF

This application is based on Japanese Patent Application No. 2004-170869 filed on Jun. 9, 2004, in Japanese Patent Office, the entire content of which is hereby incorporated by reference.

TECHNICAL FIELD

This invention relates to a photothermographic material (also referred to as dry imaging material hereinafter) and a development method and thermal development device thereof.

BACKGROUND

In recent years, there has been a strong demand for reduction in effluent resulting from the wet processing of image forming materials in the field of medicine and in the manufacture of printing plates, in view of protecting the environment and conserving space.

Accordingly, there is need for techniques relating to photothermographic materials for use in photography technology in which effective exposure such as that of a laser imager or laser image setter is possible, and in which clear black and white images with high resolution can be formed.

Known examples of techniques for the photothermographic dry imaging material include silver salt photothermographic dry imaging materials including an organic silver salt, light-sensitive silver halide and a reducing agent on a support (for example Patent Documents 1 and 2, Non-Patent. Document 1). The silver salt photothermographic dry imaging material is advantageous in that the user is provided with a system that is simpler and which does not damage the environment because processing chemicals in solution-form are never used.

These silver salt photothermographic dry imaging materials are characterized by the fact that the light-sensitive silver halide grains which are provided in a light-sensitive layer are used as a photo-sensor and the organic silver salt is the supply source for silver ions, such that images are formed by thermal development commonly at 80-140° C. using the reducing agent which is incorporated, and fixing need not be performed.

However, after exposure, because only thermal development is carried out commonly at 80-250° C. and fixing is not performed, some or all of the silver halide, the organic silver salt and the reducing agent remain after thermal development.

Thus, during extended storage, there is the problem that image quality such as silver image tone and the like tends to vary due to the fact that metallic silver is created by heat and light.

Occurrence of this type of phenomenon is remarkable in the case where the laser imager is made compact. It is thought that the reason for this is the cooling section becomes relatively small due to the smaller size and the cooling efficiency is reduced.

It is thought that when the cooling efficiency is reduced, the imaging material is discharged while it is still in an active state.

Techniques for shortening the length of the cooling section in order to make the laser imager compact have been disclosed (for example in Patent Document 3). However the imaging material is light-sensitive even after being subjected to the cooling process and in the case where the ratio of the length of the thermal development section and the cooling section is not more than 1.5 and therefore short, the above-described problem with respect to storage occurs and significant improvement is being demanded.

[Patent Document 1] U.S. Pat. No. 3,152,904 specification (Scope of the Claims)

[Patent Document 2] U.S. Pat. No. 3,487,075 specification (Scope of the Claims)

[Non-Patent Document 1] D. Morgan, B. Shelly; Thermally Processed Silver Systems A; Imaging Processes and Materials: Neblette Eighth edition, Editors: Sturge, V. Walworth, A. Shepp Page 2, 1989

[Patent Document 3] Japanese Patent Application Laid-Open No. 2004-4522 publication (Scope of the Claims)

The present invention was conceived in view of the foregoing situation and the object thereof is to provide a processing method and thermal development device for a photothermographic dry imaging material which is capable of providing images with high diagnostic characteristics even if the conveyance path in the cooling section is short due to the cooling section being made relatively small due to compacting of the device.

SUMMARY

An aspect of the invention is: a thermal development device including: a thermal development section for heating to develop a latent image formed on a light-sensitive surface of a photothermographic material; a cooling section for cooling the photothermographic material passed the thermal development section under a condition that a cooling rate for a light-insensitive surface of the photothermographic material is faster than the cooling rate for the light-sensitive surface of the photothermographic material; and a conveyance section in which the photothermographic material is conveyed via the thermal development section and the cooling section, and the length of the conveyance path that passes the cooling section is not more than 1.5 times the length of the conveyance path that passes the thermal development section.

Another aspect of the invention is: a development method for a photothermographic material including: an exposure step for exposing on a light-sensitive surface of a photothermographic material to form a latent image; a developing step for heating to develop the latent image formed on a light-sensitive surface of the exposed photothermographic material; and a cooling step after the developing step for cooling the photothermographic material under a condition that a cooling rate for a light-insensitive surface of the photothermographic material is faster than a cooling rate for the light-sensitive surface of the photothermographic material and a cooling time is not more than 1.5 times for a time required for the developing step.

BRIEF DESCRIPTION OF THE DRAWINGS

Embodiments will now be described, by way of example only, with reference to the accompanying drawing which are meant to be exemplary, not limiting, and wherein like elements numbered alike in a FIGURE, in which.

DESCRIPTION OF THE PREFERRED EMBODIMENTS

Figure 1:
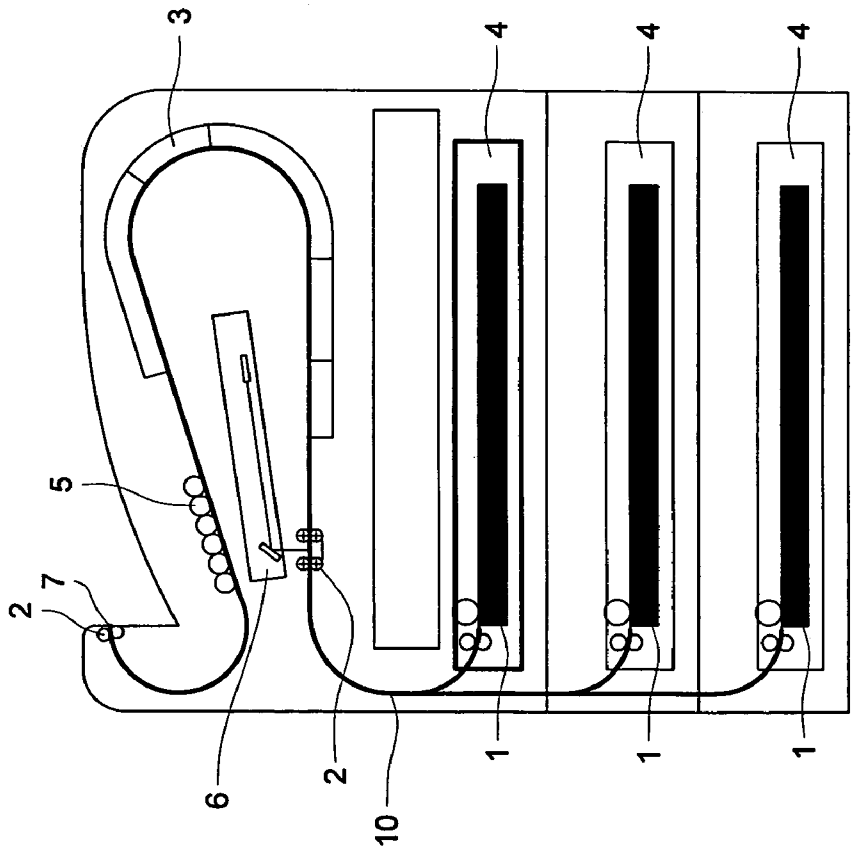
FIGS. 1(*a*) and 1(*b*) are pattern diagrams of the laser imager which is the thermal development device of this invention.
Figure 1:
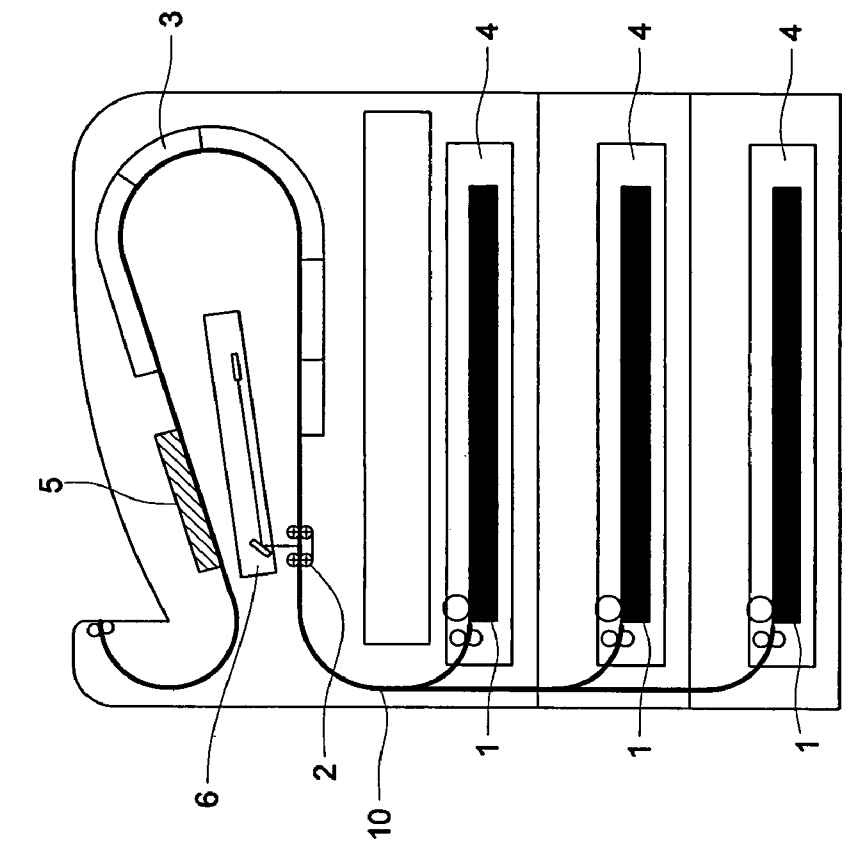

It should be understood that no single element of any of the embodiments described herein is essential, and that it is within the contemplation of the invention that one or more elements (or method steps) of one or more embodiments of the invention as described herein may be omitted or their functionality may be combined with that of other elements as a general matter of design choice.

This invention will be described in more detail in the following. The image processing method and device in this invention is characterized by the fact that the length of the conveyance path which passes the cooling section (sometimes referred to as the "cooling section length") is not more than 1.5 times the length of the conveying path which pass the thermal development section (sometimes referred to as the "thermal development section length"), and the cooling rate of the light-insensitive surface is faster than that of the light-sensitive surface. As a result of this, unevenness in development due to rapid cooling and film curling are reduced, and image storage properties are improved even in a compact laser imager whose cooling section that has a short length.

In this invention, it is preferable that the ratio of the cooling rate of the light-insensitive surface with respect to the light-sensitive surface is preferably not less than 1.1. A ratio of 1.1-5.0 is more preferable and 1.5-3.0 is most preferable. The means for increasing the cooling rate of the light-insensitive surface is not particularly limited, but is preferably in a form which the light-insensitive surface can directly contact a metal plate, a metal roller, a non-woven material, or a flocked roller. More preferable is a form which is used with the heat sink or heat pipe for actively discharging the heat which accumulated in the material, to the outside.

The length of the heat development section herein refers to the length of the conveyance path (conveyance path length) that is heated to a temperature for developing the light-sensitive material in the thermal development device. The length of the cooling section herein refers to the path length (conveyance path length) from the region beyond the point where the light-sensitive material is shielded by the thermal development device the thermal development section to the point where the light-sensitive material is discharged to the light in the chamber which is installed in the thermal development device.

Due to the thermal development device having the short cooling length in which the ratio is not more than 1.5 for the cooling section length with respect to the thermal section length, it becomes possible to provide a small thermal development device in which the processing speed is fast.

The cooling time after the light-sensitive material leaves the thermal development section up until the time of discharge can be suitably selected, but a time between 0 seconds and 25 seconds is preferable. A time between 0 seconds and 15 seconds is more preferable and between 5 seconds and 15 seconds particularly preferable.

The length of the path which the light-sensitive material takes after leaving the thermal development section up until discharge can be suitably selected, but is preferably not more than 60 cm. A length between 5 cm and 50 cm is preferable, and between 5 cm and 40 cm is particularly preferable.

The photothermographic material of this invention may be developed by various methods, but it is usually developed image-wise by increasing the temperature of the thermally developing light sensitive material that has been exposed. The preferable development temperature is 80-250° C., more preferably 100-140° C., and still more preferably 110-130° C. The development time is preferably 1-30 seconds, more preferably 3-15 seconds, and still more preferably 3-10 seconds.

A drum heater or a plate heater may be used as the thermal development system, but the plate heater system is preferable. The thermal development system which uses the plate heater is preferably the method described in Japanese Patent Application Laid-Open No. 11-133572 and the thermal development device is characterized by the fact that visible images can be obtained by causing the heating means to contact the thermally developing light-sensitive material on which latent images have been formed in the thermal development section, and the heating means comprises a plate heater and a plurality of pressing rollers which are disposed along one surface of the plate heater so as to oppose each other, and thermal development is performed by passing the thermally developing light-sensitive material between the pressing rollers and the plate heater.

The line speed of the light-sensitive material in the exposure section and the thermal development section and the cooling section may be suitably selected, but higher speeds are preferable for quick processing and for improving throughput. The line speed is preferably between 15 mm/second and 100 mm/second, more preferably between 23 mm/second and 60 mm/second, and still more preferably between 30 mm/second and 60 mm/second.

The photothermographic imaging material of the embodiment is substantially light-sensitive after the thermally developing light-sensitive material is subjected to the cooling process. Substantially light-sensitive means that the imaging material includes light sensitive material or has such material remaining therein, and does not mean that the properties, particularly the density of the material, changes due to light.

[Silver Halide Grains]

Firstly, the light-sensitive silver halide grains (sometimes simply referred to as silver halide grains hereinafter) used in the photothermographic dry imaging material of this embodiment (also referred to as photothermographic material) are described in the following.

It is to be noted that the light-sensitive silver halide grains in this embodiment refer to silver halide crystalline grains which can originally absorb light as an inherent property of silver halide crystals, can absorb visible light or infrared light through artificial physicochemical methods and are produced by treatment such that physicochemical changes occur in the interior of said silver halide crystal or on the crystal surface, when the crystals absorb any light in the wavelength ranging from ultraviolet to infrared light.

The silver halide grains used in this embodiment can be prepared in the form of a silver halide grains emulsion using the methods described P. Glafkides, "Chimie et Physique Photographique" (published by Paul Montel Co., 1967), G. F. Duffin, "Photographic Emulsion Chemistry" (published by The Focal Press,. 1966), and V. L. Zelikman et al., "Making and Coating Photographic Emulsion", published by The Focal Press, 1964). Thus any of an acidic method, a neutral method, or an ammonia method may be used, and the single-jet method, a double-jet method, or combinations thereof may be used for carrying out a reaction between the soluble silver salt and the soluble halide. However, of these methods, a method in which the silver halide salts are prepared while controlling the formation conditions, or a so-called controlled double-jet method, is preferred.

The halogen composition is not particularly limited and any of silver chloride, silver chlorobromide, silver chloroiodobromide, silver bromide, silver iodidobromide, or silver iodide may be used. However silver bromide, silver iodidobromide and silver iodide are particularly preferable.

In the case of silver iodidobromide, the amount of iodine included is preferably in the range of 0.02-16 mol %/Ag mol. The iodine may be included so as to be distributed through all of the silver halide grains or at specific locations of the silver halide grains. For example there may be a core/shell structure in which there is a high concentration of the iodine at the center of the grains and low concentration or a concentration which is substantially zero in the vicinity of the surface.

Grains formation is usually divided into the two stages of forming the silver halide grains (nuclei grains) and growing the grains, and the method where these steps are performed continuously, or the method in which nuclei (seed grains) formation and grains growing are performed separately may be used. The controlled double-jet method in which conditions for grains formation such as pAg and pH and the like can be controlled while forming grains is preferable in that grain shape and size can be controlled. For example, in the case of the method where nucleus formation and grain growth are performed separately is used, initially, the soluble silver salt and the soluble halide are quickly and uniformly mixed in a water-soluble gelatin solution and nuclei formation (nuclei formation step) is performed. Subsequently, under controlled pAg and pH and the like, and the silver halide grains are prepared using the grains growing step in which the grains are caused to grow while the soluble silver salt and the soluble halide are supplied.

The silver halide grains used in this embodiment preferable have a small grain diameter in order to suppress turbidity and coloring (yellowing) and in order to obtain favorable image quality. It is preferable that the average grain diameter, when the grains having a diameter of less than 0.02 μm are out of the limits of measurement, is between 0.030 μm and 0.055 μm or less.

It is to be noted that the grain diameter herein refers to length of the edge of the silver halide grains in the case where the silver halide grains is a so-called regular crystal such as a cube or an octahedron. In addition, in the case where the silver halide grains are planar, the grain diameter refers to the diameter of the circle which has the same area as the projection area of the main surface.

In this embodiment, the silver halide grains are preferably monodispersed. Monodispersion herein refers to the variation coefficient of the grain diameter which is obtained by the equation below, being 30% or less. The variation coefficient is preferably 20% or less and more preferably 15% or less.

Variation coefficient of the grain diameter=standard deviation of grain diameter/average value of grain diameter×100 (%)

Examples of the shapes of the silver halide grains include be cubic, octahedral and tetradecahedral grains, planar grains, spherical grains, rod-shaped grains, and potato-shaped grains. Of these, cubic, octahedral, tetradecahedral, and planar silver halide grains are particularly preferred.

In the case where planar silver halide grains are used, the average aspect ratio is preferably between 1.5 and 100, and more preferably between 2 and 50. These are disclosed U.S. Pat. Nos. 5,246,337, 5,314,798 and 5,320,958, and the target planar grains can be easily prepared. Furthermore, silver halide grains with corners that have been made round can be favorably used.

The crystal habit of the outer surface of the silver halide grains is not particularly limited. However, when spectral sensitizing dyes, which exhibit crystal habit (surface) selectiveness, are used, it is preferable that a relatively high ratio of silver halide grains which have the crystal habit matching their selectiveness are used. For example, in the case where sensitizing dyes, which are selectively adsorbed onto a crystal plane having a Miller index of [100] is used, it is preferable that the ratio of the [100] plane on the external surface of silver halide grains is high. The ratio is preferably 50% or more, more preferably 70% or more, and a ratio of 80% or more is particularly preferable. Conversely in the case where the sensitizing dye that selectively adsorbed onto the crystal plane having a Miller index of (111) is used, the ratio of the (111) plane on the outer surface of the silver halide grains is preferably increased. It is to be noted that the Miller index of (100) plane can be determined from T. Tani, J. Imaging Sci., 29, 165 (1985) utilizing adsorption dependence of sensitizing dye in [111] plane and [100] plane.

The silver halide grains used in this embodiment are preferably prepared using a low molecular weight gelatin whose average molecular weight at the time of grains formation is 50,000 or less. The low molecular weight gelatin is one having an average molecular weight of 50,000 or less and is preferably between 2,000-40,000 and more preferably between 5,000 and 25,000. The average molecular weight of gelatin can be measured using gel filtration chromatography.

The concentration of the dispersing media at the time of nuclei formation is preferably 5 percent by weight or less, and the dispersion can be effectively performed at the low concentration of 0.05-3.0 percent by weight.

The silver halide grains used in this embodiment may use the polyethylene oxide compounds shown in the general formula below.

General Formula $$YO\,(CH_2CH_2O)_m(CH(CH_3)CH_2O)_p(CH_2CH_2O)_nY$$

In this general formula, Y represents a hydrogen atom, $-SO_3M^1$, or $-CO-B-COOM^1$ and $M^1$ represents a hydrogen atom, an alkali metal atom, an ammonium group or an ammonium group substituted with an alkyl group having less than or equal to 5 carbon atoms; and B represents a chain or cyclical group which form an organic dibasic acid. m and n each represents 0-50 and p represents 1-100.

The polyethylene oxide compounds shown in the above general formula is preferably used as an antifoaming agent when producing the light-sensitive material, as considerable foaming occurs in the case where the raw materials for the emulsion are mixed or transported in the steps such as the step of producing an water-soluble gelatin, the step of adding the soluble halide and the soluble silver salt, and the step of coating the silver halide emulsion on a support. The technique for using the antifoaming agent is described for example in Japanese Patent Application Laid-Open No, 44-9497, and the polyethylene oxide compounds shown in the above general formula may also function as an antifoaming agent at the time of nuclei formation.

The polyethylene oxide compound shown in the above general formula is preferably less than 1 percent by weight or less with respect to silver, and more preferably 0.01-0.1 percent by weight.

The polyethylene oxide compound shown in the above general formula may be present at the time of nuclei formation, and is preferably added to the dispersing media prior to nuclei formation. However, they may also be added at the time of nuclei formation, or they may be employed by adding them to a water-soluble silver salt solution or a water-soluble halide solution which is used at the time of nuclei formation. However, they are preferably used by adding them to a water-soluble halide solution, or to both aqueous solutions in an amount of 0.01 to 2.0 percent by weight. Furthermore, it is preferable that the solution is present for a time lasting at least 50% of the nuclei forming step, and is more preferably present for a time lasting at least 70% of the nuclei forming step. The polyethylene oxide compounds shown in the above general formula may be added as a powder or may be dissolved in a solvent such as methanol or the like and used.

It is to be noted that the temperature for nuclei formation is 5-60° C., and more preferably 15-50° C., and the temperature may be controlled within the abovementioned temperature range by being constant or having an increasing pattern (such as a temperature of 25° C. at the starting of nuclei formation and then gradually increasing during nuclei formation to a temperature of 40° C. at the completion of nuclei formation) or the reverse sequence.

The concentration of the aqueous solution of silver salts or the aqueous halide solution used in nuclei formation is preferably 3.5 mol/L or less, and more preferably the low concentration range of 0.01-2.5 mol/L is used. The addition rate per 1 L of reaction solution of the silver ion at the time of nuclei formation is preferably $5\times10^{-3}$-$3.0\times10^{-1}$ mol/minute and more preferably $3\times10^{-3}$-$8.0\times10^{-2}$ mol/minute.

The pH at the time of nuclei formation is set in the range of 1.7-10, but the pH is preferably 2-6 because the grain diameter distribution of the nuclei that is formed become wide when the pH is at the alkaline side. Furthermore, at the time of nuclei formation, the pBr is about 0.05-3.0 and more preferably 1.0-2.5 and still more preferably 1.5-2.0.

[Internal Latent Silver Halide Grains After Thermal Development]

The light-sensitive silver halide grains of this embodiment are characterized by the fact that they are silver halide grains whose surface sensitivity are reduced due to conversion from the surface latent image type silver halide grains to the internal latent image type silver halide grains. That is to say, in exposure prior to thermal development, the silver halide grains functions as a catalyst for the development reaction (reduction reaction of silver ions due to the silver ion reducing agent) and the latent image which is obtained is formed on the surface of the silver halide grains. In the exposure subsequent to the course of the thermal development step, many latent images are further in the silver halide grains than the surface. As a result of this the formation of latent images on the surface of the silver halide grains is controlled. It is to be noted that using silver halide grains whose ability to form latent images change considerably immediately before and after thermal development processing is known in the prior art.

Generally, when light-sensitive silver halide grains are exposed, the silver halide grains or the spectral sensitized dyes which are adsorbed onto the silver halide grain surface are excited by light, and electrons that can move freely are generated. However, these electrons are competitively trapped (captured) in the electron trap that is present on the silver halide grain surface (center of light sensitivity) or in the electron trap that is inside said grains. Accordingly, latent images are preferentially formed on the surface in the case where there are more and appropriate numbers of chemical sensitizer centers (chemical sensitizer nuclei) which are effective as electron traps, or dopants and the like on the surface of the silver halide grains than on the inner portion, and development thereby becomes possible. Conversely, latent images are preferentially formed on the inner side in the case where there are more and appropriate numbers of chemical sensitizer centers (chemical sensitizer nuclei) which are effective as electron traps or dopants and the like on the inner portion of the silver halide grains than on the surface, and surface development is difficult. In other words, it can be said that in the former case, sensitivity is higher on the surface than on the inner portion, while in the latter case, the sensitivity is lower on the surface than at the inner portion. (Reference Documents: (1) T. H. James (Editor) "The Theory of Photographic Process" Fourth edition, Macmillan Publishing Co. Ltd., 1977 (2) Japan Photography Society, "Foundation of Photographic Process" (Silver Salt Photography Edition) Corona 1998.

In the light-sensitive silver halide grains of this embodiment, including a dopant which functions as an electron trapping dopant inside the silver halide grains at least during exposure after thermal development is preferable in view of sensitivity and image storage stability.

It is to be noted that at the time of exposure for image formation prior to thermal development, a dopant that functions as a positive hole and changes in the thermal development step such that it can function as an electron trap subsequent to thermal development is particularly preferable.

The electron trapping dopant used herein refers to an element or compound other silver and halogen which comprise the silver halide grains, and the dopant itself has the property of being capable of trapping (capturing) free electrons, or the dopant forms a lattice defect site or the like which has electron trapping properties due to the silver halide grains being included in said dopant. Examples of the electron trapping dopant include metal ions other than silver and salt or complexes thereof, chalcogens (elements of the oxygen family) such as sulfur selenium, and tellurium and inorganic compounds and organic compounds including nitrogen atoms or metal complexes thereof, and rare earth ions and complexes thereof.

Examples of the metal ions and salts or complexes thereof include lead ions, bismuth ions, gold ions and the like and lead bromide, lead nitrate, lead carbonate, lead sulfate, bismuth nitrate, bismuth chloride, bismuth trichloride, bismuth carbonate, sodium bismuthate, gold chloride, lead acetate, lead stearate, bismuth acetate and the like.

Various chalcogen discharging compounds generally known as chalcogen sensitizer in the photography industry can be used as the compound including chalcogens such as sulfur selenium, and tellurium. Heterocyclic compounds are preferable as the organic compound including a chalcogen or nitrogen. Examples include imidazole, pyrazole, pyridine, pyrimidine, pyrazine, pyridazine, triazole, triazine, indole, indazole, purine, thiadiazole, oxadiazole, quinoline, phtalazine, napthylidine, quinoxaline, quinazoline, cinnoline, pteridine, acridine, phenanthroline, phenazine, tetrazole, thiazole, oxazole, benzimidazole, benzoxazole, benzthiazole, indolenine, and tetrazaindene, and preferable are imidazole, pyridine, pyrimidine, pyrazine, pyridazine, triazole, triazine, thiadiazole, oxadiazole, quinoline, phtalazine, napthylidine, quinoxaline, quinazoline, cinnoline, tetrazole, thiazole, oxazole, benzimidazole, benzoxazole, benzthiazole, and tetrazaindene.

It is to be noted that the above heterocyclic compound may have a substituent group and preferable examples of the substituent group include, an alkyl group, an alkenyl group, aryl group, an alkoxy group, an aryloxy group, an acyloxy group, an acyl group, an alkoxycarbonyl group, an aryloxycarbonyl group, acyloxy group, an acylamino group, an alkoxycarbonylamino group, an aryloxycarbonyl amino group, a sulfonylamino group, a sulfamoyl group, a carbamoyl group, a sulfonyl group, a ureide group, an amide phosphate group, a halogen atom, a cyano group, a sulfo group, a carboxyl group, a nitro group, and a heterocyclic group. Of these, the more preferable examples are the alkyl group, the aryl group, the alkoxy group, the aryloxy group, the acyl group, the acylamino group, the alkoxycarbonylamino group, the aryloxycarbonyl amino group, the sulfonylamino group, the sulfamoyl group, the carbamoyl group, the ureide group, the amide phosphate group, the halogen atom, the cyano group, the nitro group, and the heterocyclic group, and even more preferable are the alkyl group, the aryl group, the alkoxy group, the aryloxy group, the acyl group, the acylamino group, the sulfonylamino group, the sulfamoyl group, the carbamoyl group, the halogen atom, the cyano group, the nitro group, and the heterocyclic group.

It is to be noted that the silver halide grains of this invention used in this embodiment may include ions of transition metals from group 6 to group 11 of the periodic table which are chemically prepared from the oxidized metals using ligands and the like, such that they function as an electron trapping dopant like the dopant described above, or as a hole trapping dopant. Preferable examples of the transition metals include W, Fe, Co, Ni, Cu, Ru, Rh, Pd, Re, Os, Ir, and Pt.

In this embodiment, one type of the abovementioned types of dopant may be used or two or more compounds or complexes of the same or different types of dopants may be used together. However, at least one type needs to function as the electron trapping dopant at the time of the exposure subsequent to thermal development. These dopants may be introduced into the silver halide grains in any chemical form.

It is to be noted that in this invention, using any one type of complex or salt of Ir or Cu alone for doping is not particularly favorable.

The dopant is preferably included in a proportion in the range of $1\times10^{-9}$-$1\times10$ mol per mol of silver, and more preferably in the range of $1\times10^{-8}$-$1\times10^{-1}$ mol per mol of silver, and even more preferably in the range of $1\times10^{-6}$-$1\times10^{-2}$ mol per mol of silver.

However, the optimal amount depends of the type of dopant, the grain diameter and shape of the silver halide grains, as well as other environmental conditions, and thus it is favorable that optimization of these conditions for addition of the dopants is examined in accordance with the conditions.

In this embodiment, the transition metal complex or complex ion is preferably one represented by the general formula below.

$$[ML_6]^m \qquad \text{General formula}$$

In this formula, M represents a transition metal selected from elements from groups 6-11 of the periodic table, L represents a ligand, m represents 0, -, 2-, 3-, or 4-. Specific examples of the ligand represented by L include a halogen ions (such as a fluorine ion, a chlorine ion, a bromine ion, an iodine ion), a cyanide, a cyanato, a thiocyanato, a selenocyanato, a tellurocyanato, an azido and an aqua ligand as well as nitrosyl, thionitrosyl and the like. Of these preferable are aqua, nitrosyl, and thionitrosyl. In the case where the aqua ligand is present, it is preferable one or two ligands is occupied by the aqua. L may the same or different.

The compounds which supply these metal ions or complex ions are preferably added during formation of the silver halide grains so as to be incorporated into the silver halide grains, and may be added any stage in the preparation of the silver halide grains, namely, in nuclei formation, growth, physical ripening, and before or after chemical sensitizing. However it is particularly preferable that they are added at the stage of nuclei formation, growth or physical ripening, and more preferably added at the stage of nuclei formation or growth, and most preferably added at the stage of nuclei formation. At the time of addition, the compounds may be divided up into several portions and added over a number of times. Further they may be uniformly incorporated in the inside of silver halide grains. They may also be incorporated so as to have the distribution in the inside of the grains as shown, for example, in Japanese Patent Application Laid-Open Nos. 63-29603, No. 2-306236, No. 3-167545, No. 4-76534, No. 6-110146, No. 5-273683 and the like.

These metal compounds may be dissolved in water or a suitable organic solvent (such as alcohols, ethers, glycols, ketones, esters, amides), and then added. Examples of the method of addition include: a method in which an aqueous solution of metallic compound powder or an aqueous solution into which a metallic compound and NaCl and KCl are dissolved together and then added to the a water-soluble silver chloride solution or a water-soluble halide solution to carry out grain formation; a method in which the silver halide grains are prepared by simultaneously mixing the a water-soluble silver salt solution or a water-soluble halide solution and this is added as a third aqueous solution using the triple-jet method; a method in which an aqueous solution of the necessary amount of the metallic compound is introduced into a reaction vessel during grain formation; and a method in which during preparation of the silver halide, separate silver halide grains which are doped in advance with metal ions or complex ions are added and dissolved In particular, the method in which either an aqueous solution of metal compound powder or an aqueous solution into which a metal compounds and NaCl and KCl are dissolved together is added to the aqueous halide solution is particularly favorable. When added onto the grain surface, an aqueous metal compound solution in a necessary amount may be added to a reaction vessel immediately after grain formation, during or after physical ripening, or during chemical ripening.

It is to be noted that a non-metallic dopant may be introduced inside the silver halide using the same method as that for the metallic dopant.

In the imaging material of this embodiment, a determination as to whether the above-described dopant has electron trapping properties can be evaluated using the methods generally used in the photography industry as described in the following. Namely, the evaluation can be done by measuring the reduction rate of photoconductivity of the silver halide emulsion formed from the silver halide grains whose insides have been doped with the dopant or the components thereof. This measurement is done using as a reference, the silver halide emulsion which does not contain a dopant, by the photoconductivity measurement, using a method for measuring the microwave photoconductivity of the silver halide emulsion forming the silver halide grains. Furthermore, the evaluation can be done by way of comparative experiments for the inside sensitivity and the surface sensitivity of the silver halide grains.

Also, the method for evaluating the effects of the electron trapping dopant of this invention after being used as a photothermographic dry imaging material may, for example, be carried out by heating under the same conditions as for actual development that is commonly practiced prior to exposure of said imaging material. Subsequently, the sensitivity obtained based on the white light or on light of a specific spectral sensitivity region (in the case where spectral sensitization is performed for laser beam of a specific wavelength region, the light of said wavelength region, for example infrared light in the case where infrared light is subjected to spectral sensitization) are compared at a fixed time (such as 30 seconds) with the sensitivity of the imaging material which uses the silver halide grains emulsion which does not contain the electron trapping dopant. That is to say, the sensitivity of the former sample which contains the silver halide grain emulsion containing the dopant of this invention is comparatively low when compared with the sensitivity of that which does not contain the dopant.

It is to be noted that after white light or light of a specific spectral sensitivity region (such as infrared light) passes the optical wedge in the fixed time (such as 30 seconds), and exposure is carried out on this material, heating is carried out under the same conditions as the normal thermal development conditions prior to exposure for the sensitivity of the sample obtained based on the characteristic curve obtained when thermal development is performed under normal thermal development conditions. Subsequently, an exposure of the same fixed time as above, and a fixed exposure are performed the sensitivity obtained based on the characteristic curve obtained by thermal development under normal thermal development conditions is 1/10 or less and more preferably 1/20 or less, and in the case where the silver halide emulsion is subjected to chemical sensitization, the low sensitivity of 1/50 or less is preferable.

The silver halide grains of this embodiment may be added to a light-sensitive layer using any of various methods, and when added, the silver halide grains are preferably arranged near a reducible silver source (an aliphatic carboxylic acid silver salt). This is preferable in order to obtain an imaging material with high sensitivity and high covering power (CP).

In view of production control, it is preferable that the silver halide grains of this embodiment are prepared in advance, and added to a solution for preparing these aliphatic carboxylic acid silver salt grains, since the silver halide grains preparation process and the aliphatic carboxylic acid silver salt grains preparation process are handled separately. However, as described in British Patent No. 1,447,454, when the aliphatic carboxylic acid silver salt grains are being prepared, the halogen components such as the halide ion are mixed with the aliphatic carboxylic acid silver salt forming component, and by introducing silver ions into this mixture, the silver halide grains which are formed almost simultaneously with the formation of the aliphatic carboxylic acid silver salt grains can be prepared. Furthermore, it is possible to prepare silver halide grains by conversion of aliphatic carboxylic acid silver salts by causing halogen containing compounds to act on aliphatic carboxylic acid silver salts. That is to say, it is possible to convert some of the aliphatic carboxylic acid silver salt to light-sensitive silver halide by causing components for forming silver halide to act on a previously prepared aliphatic carboxylic acid silver salt solution or dispersion, or a sheet material comprising aliphatic carboxylic acid silver salts.

The components for forming the silver halide grains include inorganic halides, onium halides, halogenated hydrocarbons, N-halogenated compounds, and other compounds containing halogens. Specific examples thereof are disclosed in U.S. Pat. Nos. 4,009,039, 3,457,075, 4,003,749, British Patent No. 1,489,956 and Japanese Patent Application Laid-Open Nos. 53-27027 and 53-25420.

As described above, silver halide grains that are prepared by converting some of the aliphatic carboxylic acid silver salt using separately prepared silver halide grains may also be used.

These silver halide grains are preferably used together with the separately prepared silver halide grains and the silver halide grains which are prepared by converting aliphatic carboxylic acid silver salts in a ratio of 0.001-0.7 mol per mol of aliphatic carboxylic acid silver salts, and more preferably in an amount of 0.03-0.5 mol.

The separately prepared light-sensitive silver halide grains are subjected to desalting for removing excess salt using known desalting methods, such as a noodle method, a flocculation method, an ultrafiltration method, and electrodialysis method, but the light-sensitive silver halide grains may also be used without performing desalination.

[Light-Insensitive Aliphatic Carboxylic Acid Silver Salt]

The light-insensitive aliphatic carboxylic acid silver salt of this embodiment is a reducible silver source and is preferably a silver salt of a long chain carboxylic acid having 10-30 carbon atoms and more preferably 15-25 carbon atoms. Examples of favorable light-insensitive aliphatic carboxylic acid silver salt are given below.

Examples include silver salts of gallic acid, oxalic acid, behenic acid, stearic acid, arachidic acid, palimitic acid, and lauric acid, and preferable silver salts are silver behenate, silver arachidate, and silver stearate.

In addition, in this embodiment, mixing two or more types of the aliphatic carboxylic acid silver salt is preferable in view of improving development characteristics and forming high density and high contrast silver images, and it is also preferable for example that a silver ion solution is mixed with two or more types of aliphatic carboxylic acid mixtures.

Meanwhile, in view of storage stability of the image after development, the melting point of the aliphatic carboxylic acid which is the source of the aliphatic carboxylic acid silver is 50° C. or more, and more preferably 60° C. or more. The ratio of the silver salt included in the aliphatic carboxylic acid is 50 mol % or more and more preferably 70 mol % or more and still more preferably 80 mol % or more. In view of this it is preferable that the percentage of silver behenate included is high.

The aliphatic carboxylic acid silver salts are prepared by mixing water-soluble silver compounds with compounds which form complexes with silver. A normal mixing method, a reverse mixing method, a double-jet method and the controlled double-jet method such as that disclosed in Japanese Patent Application Laid-Open No. 9-127643 are preferably used for carrying out the mixing. For example, after preparing organic acid alkali metal salt soap (such as sodium behenate, sodium arachidinate and the like) by adding alkali metal salts (such as sodium hydroxide and potassium hydroxide) to organic acid, the soap and silver nitrate or the like are mixed using the controlled double-jet method to produce crystals of aliphatic carboxylic acid silver salt. At that time, seed crystal grains of the aliphatic carboxylic acid silver salt and silver halide grains may be mixed.

Examples of the types of the alkali metal salt used in this embodiment include sodium hydroxide, potassium hydroxide, lithium hydroxide and the like, but it preferable that sodium hydroxide and potassium hydroxide are used together. The proportion in which they are used together is preferably such that the mole ratio of both hydroxide salts is in a range of 10:90-75:25. By using the above range, when the hydroxide salt reacts with the aliphatic carboxylic acid to form an alkali metal salt of the aliphatic carboxylic acid, the viscosity of the reaction solution is controlled so as to be favorable.

In addition, if the aliphatic silver carboxylic acid is produced in the presence of silver halide grains having an average grain diameter of 0.050 μm or less, it is favorable that proportion of potassium in the alkali metal of the alkali metal salt is high because this prevents dissolution of the silver halide grains and Ostwald ripening. Furthermore, the higher the proportion of potassium salt, the smaller the size of the aliphatic acid silver salt grains will be. The preferable potassium salt proportion is 50-100% with respect to all the alkali metal salts used in the process of preparing the aliphatic carboxylic acid silver. The concentration of the alkali metal salts is preferably 0.1-0.3 mol/1000 ml.

[Silver Salt Grains with High Mercuration Rate]

The emulsion containing the aliphatic carboxylic acid silver salt grains of this embodiment is a mixture of free aliphatic carboxylic acid which does not form silver salts and aliphatic carboxylic acid silver salts. However, it is preferable that the ratio of the former is less than that of the latter in view of image storage stability and the like. That is to say, the emulsion of this embodiment preferably includes 3-10 mol % of aliphatic carboxylic acid with respect to the aliphatic carboxylic acid silver salt grains. Including 4-8 mol % is particularly preferable.

It is to be noted that by obtaining the total aliphatic carboxylic acid amount and the free aliphatic carboxylic acid amount respectively using the method described below, the amounts and respective ratios of the aliphatic carboxylic acid silver salt and the free aliphatic carboxylic acid as well as the ratio of the free aliphatic acid with respect to the total amount aliphatic carboxylic acid can be calculated.

(Assay of the Total Aliphatic Carboxylic Acid Amount (Total of the Amount Originating from Both the Aliphatic Carboxylic Acid Silver Salts and the Free Acid))

(1) Accurately weigh approximately 10 mg of the sample (the quantity stripped when there is stripping from the light-sensitive material) and pour into a 200 ml measuring flask. (2) Add 15 ml of methanol and 3 ml of 4 mol/L hydrochloric acid, and perform ultrasonic dispersion for 1 hour. (3) Add zeolite made of Teflon (registered trademark) and reflux for 60 minutes. (4) After cooling, add 5 ml of methanol from above the cooling tube and rinse and pour any substance adhering to the cooling tube into the measuring flask (perform twice). (5) Extract the resultant reaction solution using ethyl acetate (Perform separating extraction twice by adding 100 ml of ethyl acetate and 70 ml of water). (6) Vacuum dry at room temperature for 30 minutes. (7) Add 1 ml of benzanthrone solution as the internal standard to a 10 ml measuring flask (Dissolve approximately 100 mg of benzanthrone in toluene and make the solution up to 100 ml with toluene). (8) Dissolve the sample in toluene and add to the measuring flask of (7) and make up with toluene. (9) Perform gas chromatography (GC) measurement under the measuring conditions listed below.

Device: HP-5890+HP-Chemistation

Column: HP-1 30 m×0.32 mm×0.25 μm (manufactured by HP)

Inlet port: 250° C.

Detector: 280° C.

Oven: 250° C. constant

Carrier gas: He

Head pressure: 80 kPa (Assay of Free Aliphatic Carboxylic Acid Amount)

(1) Accurately measure approximately 20 mg of the sample and pour into a 200 ml measuring flask and add 10 ml of methanol. Perform ultrasonic dispersion for 1 minute at 25° C. (free organic carboxylic acid is extracted). (2) Filter the resultant mixture and pour the filtrate into a 200 ml measuring flask and harden by drying (free organic carboxylic acid is separated). (3) Add 15 ml of methanol and 3 ml of 4 mol/L hydrochloric acid and perform ultrasonic dispersion for 1 minute. (4) Add zeolite made of Teflon (registered trademark) and reflux for 60 minutes. (5) Add 60 ml of water and 60 ml of ethyl acetate to the resulting reactant solution and extract the methyl esterified organic carboxylic acid in an ethyl acetate phase. Perform the ethyl acetate extraction twice. (6) Harden the ethyl acetate phase by drying and then vacuum dry at room temperature for 30 minutes. (7) Add 1 ml of benzanthrone solution to a 10 ml measuring flask (Dissolve approximately 100 mg of benzanthrone in toluene as the internal standard and make the solution up to 100 ml). (8) Dissolve (6) in toluene and add the resultant solution to the measuring flask of (7) and make up with toluene. (9) Perform GC measurement under the measuring conditions listed below.

Device: HP-5890+HP-Chemistation

Column: HP-1 30 m×0.32 mm×0.25 μm (manufactured by HP)

Inlet port: 250° C.

Detector: 280° C.

Oven: 250° C. constant

Carrier gas: He

Head pressure: 80 kPa

[Structure and Configuration of the Aliphatic Carboxylic Acid Silver Salts]

The aliphatic carboxylic acid silver salts of this embodiment may be crystal grains having a core/shell structure such as that described in European Patent No. 1168069A1 and Japanese Patent Application Laid-Open No. 2002-23303. It is to be noted that in the case where the core/shell structure is used, all or some of the core portion or the shell portion may be used as the structural component of the crystal grains of the organic silver salt other than the aliphatic carboxylic acid silver such as silver salts of phatalic acid, benzoimidazole and the like.

In the aliphatic carboxylic acid silver salt of this embodiment, the average circle equivalent diameter is preferably between 0.05 μm and 0.8 μm, and the mean thickness is preferably between 0.005 μm and 0.07 μm, and particularly preferable is an average circle equivalent diameter that is between 0.2 μm and 0.5 μm and an mean thickness that is between 0.01 μm and 0.05 μm.

If the average circle equivalent diameter is greater than 0.05 μm, transparency is excellent, but image storage stability is poor, and also if the mean grain diameter exceeds 0.8 μm haze is a problem. When the mean thickness exceeds 0.005 μm, the surface area of the grain is large and at the time of development, the silver ions are supplied rapidly. Thus, in the low concentration portions in particular, a large amount of silver ions are not used in the silver images and remain in the layer, and as a result, there is a considerable deterioration in image storage stability. In addition, if the mean thickness is greater than 0.07 μm, the surface area of the grain is small and the stability of the image is improved, but the supply of silver at the time of development is slow, and in the high concentration areas in particular, and this causes unevenness in the developed silver, and as a result there is a tendency for the maximum density to be reduced.

In order to determine the average circle equivalent diameter, the aliphatic carboxylic acid silver salt that has been dispersed is diluted and dispersed onto a grid fitted with a carbon supporting film, and imaged using a transmission electron microscope (such as the 2000 FX model manufactured by Nippon Denshi) at a direct magnification of 5000 times. The negative is read as a digital image using a scanner and the appropriate image processing software is used to measure the grain diameter (circle equivalent diameter) of 300 or more grains and then the mean grain diameter was calculated.

Calculations can be done to determine the average thickness, by a method using the TEM (transmission electron microscope) as shown below.

First, light-sensitive layer that has been coated onto a support is pasted to a suitable holder using an adhesive, and then a diamond knife is used in the direction orthogonal to the support surface to prepare ultra-thin sections with a thickness of 0.1-0.2 μm. The ultra-thin sections that were prepared are supported on a copper mesh and then transferred to a carbon film that has been made hydrophilic by glow discharge and then observed as a bright field image at a magnification of 5,000 times to 40,000 times using a transition electron microscope (TEM hereinafter) while cooling at −130° C. or lower using liquid nitrogen. The images are then quickly recorded using film, imaging plate, CCD camera or the like. At this time, it is preferable that a section with no breakage damage or looseness is used for the field that is observed.

The carbon film is preferably one that is supported on an such as extremely thin organic film such as collodion, Formvar or the like, and more preferably one that is formed on a salt rock substrate and the support is removed by dissolution. The film may also be a film of only carbon that is obtained by removing the abovementioned organic film using an organic solvent or ion etching. The acceleration voltage of the TEM is preferably 80 to 400 kV and more preferably 80 to 200 kV.

In addition, electron microscope observation techniques and sample preparation techniques that are described in detail, in "Observation Techniques of Electron Microscopy in Medical Science and Biology", edited by Japanese Society of Electron Microscopy, Kanto-branch (Maruzen) and "Biological Sample Preparation Methods of Electron Microscopy", edited by of Japanese Society of Electron Microscopy, (Kanto-branch Maruzen) may be referred to.

It is preferable that the TEM image that is recorded on a suitable medium is broken down into single sheet images of at least 1024 pixels×1024 pixels and more preferably 2048 pixels×2048 pixels and then subjected to image processing using a computer. In order to perform image processing, the analog image that is recorded on film is preferably converted to a digital image using a scanner or the like and subjected to shading correction or edge enhancement and the like as needed. A histogram is subsequently created and the positions corresponding to the aliphatic silver carboxylate are extracted by binary coded processing.

The thickness of the 300 or more of the extracted aliphatic carboxylic acid silver salt grains is manually measured using appropriate software and the average value is determined.

The method for obtaining the aliphatic carboxylic acid silver salt grains having the shapes described above is not particularly limited, but it is effective to favorably maintain the mixed state at the formation of the alkali metal salt soap of an organic acid or at the addition of silver nitrate to the soap, and to optimize the ratio of an organic acid to the soap and the ratio of silver nitrate which reacts to the soap.

In this embodiment, the planar aliphatic carboxylic acid silver salt grains (that is the aliphatic carboxylic acid silver salt grains having an average circle equivalent diameter of between 0.05 μm and 0.8 μm and average thickness between 0.005 μm and 0.07 μm), are preferably preliminarily dispersed with a binder and a surfactant as needed, and then crushed using a media disperser or a high pressure homogenizer and the like. Examples of the preliminary dispersion methods that may be used include those using a common stirrer such an anchor type or propeller type, a high-speed rotation centrifuge radial type stirrer (dissolver) or high-speed rotation shearing type agitator (homogenizer).

The media disperser used in this invention may for example be a rotation mill such as a ball mill, a planetary mill, a vibrating ball mill and the like or a bead mill which is a medium stirring mill, an attritor, or a basket mill or the like. The type of high pressure homogenizer used may be: the type that causes collision on a wall or plug or the like; the type in which the liquid is divided into a plurality of portions and causing the liquid portions to collide with each other; and the type in which the liquid is passed through a minute orifices.

The ceramic beads used for media dispersion are preferably yttrium stabilized zirconia, zirconia reinforced alumina (the ceramic beads including zirconia is referred to as zirconia hereinafter) in order to reduce creation of impurities due to friction of the beads and the disperser at the time of dispersion.

The type of device used when dispersing the planar aliphatic carboxylic acid silver salt grains of this embodiment preferably uses ceramics such as zirconia, alumina, silicon nitride, and boron nitride, or diamond, and of these zirconia is preferably used as a material to which the aliphatic carboxylic acid silver salt grains adhere. When the dispersion is performed, the concentration of the binder added is preferably 0.1-10% by weight of the aliphatic silver carboxylate and it is preferable that the temperature does not exceed 45° C. from preliminary dispersion to the main dispersion. Furthermore, the preferable operating conditions for the main dispersion are preferably 29-100 MPa and a number of runs of two or more in the case where a high pressure homogenizer is used as the dispersing means. In addition, in the case where a media disperser is used as the dispersion means the circumferential speed is 6-13 m/second.

The light-insensitive aliphatic carboxylic acid silver salt grains of this embodiment are preferably formed in the presence of a compound that functions as a crystal growth inhibitor or a dispersing media. In addition, the compound that functions as a crystal growth inhibitor or a dispersing media, is an organic compound containing a hydroxyl group or a carboxyl group.

In this embodiment, in the aliphatic silver carboxylate grains producing step, the compound which functions as a crystal growth inhibitor or a dispersing media for the aliphatic silver carbonate grains refers to a compound having the function and effect by which the diameter of the grains is smaller and which increases monodispersion when the silver aliphatic carboxylate grains are prepared in the presence the compound than when prepared under conditions where the compound is not present together. Specific examples of the compound include monovalent alcohols having 10 or less carbon atoms, and preferably secondary alcohols and tertiary alcohols, glycols such as ethylene glycol and propylene glycol, polyethers such as polyethylene glycol, and glycerin. The amount that is preferably added is 10-200 percent by weight of the silver aliphatic silver carboxylate.

Meanwhile, branched aliphatic carboxylic acids, each containing an isomer, such as isoheptanic acid, isodecanoic acid, isotridecanoic acid, isomyristic acid, isopalimitic acid, isosteraric acid, isoarachidic acid, isobehic acid, and isohexaconic acid preferable. In this case, examples of preferable side chains are an alkyl group or an alkenyl groups containing 4 or less carbon atoms. In addition, aliphatic unsaturated carboxylic acids such as palmitoleic acid, oleic acid, linoleic acid, linolenic acid, moroctic acid, eicosenoic acid, arachidonic acid, eicosapentaenoic acid, erucic acid, docosapentaenoic acid, docosahexaenoic acid, and selacholenic acid. The amount that is preferably added is 0.5-10 mol % of the aliphatic carboxylic acid.

Other favorable examples of the compound are glycosides such as glucoside, galactoside and fructoside; trehalose based disaccharides such as trehalose, sucrose and the like, polysaccharides such as glycogen, dextrin, dextran, alginic acid and the like; cellosolves such as methyl cellosolve, ethyl cellosolve and the like, water-soluble organic solvents such as sorbitan, sorbitol, ethyl acetate, methyl acetate, dimethyl formamide and the like; and water-soluble polymers such as polyvinyl alcohol, polyacrylic acid, acrylic acid copolymers, maleinic acid copolymers, carboxymethyl cellulose, hydroxypropyl cellulose, hydroxypropyl methyl cellulose, polyvinyl-pyrrolidone, gelatin and the like. The amount that is preferably added is 0.1-20 percent by weight of the aliphatic silver carbonate.

Alcohol having 10 or less carbon atoms, preferably secondary alcohols such as isopropyl alcohol and the like, and tertiary alcohols such as t-butyl alcohol and the like increase the solubility of the alkali metal aliphatic carboxylate in the grain production process, and viscosity is thereby lowered so as increase stirring efficiency, monodispersion properties, as well as to decrease grain diameter. Steric hindrance of the branched aliphatic carboxylic acid and aliphatic unsaturated carboxylic acid is higher than in the straight chain aliphatic carboxylic acid silver salts which is the main component, when the aliphatic carboxylic acid silver salts is being crystallized so as to increase the agitation of crystal lattices and as a result grain size decreases because large crystals cannot be formed.

[Anti-Fogging Agent and Image Stabilizer]

As described above, the greatest difference in terms of composition between silver halide light-sensitive photographic material of the prior art and the silver salt photothermographic dry imaging material is that in the material of the latter, there is a large amount of light-sensitive silver halide, organic silver salts, and reducing agents which cause fogging and print out silver, are either before or after the development processing both before and after development. Thus in order to maintain storage stability is not only prior to development, but also after development in the dry imaging material of silver salt photothermographic dry imaging material, a high level techniques for fog prevention and image stabilization is required, and in the past aside from the aromatic heterocyclic compound for limiting the growth of the fogging nuclei and development, mercury compounds such as mercury acetate which functions to diminish of the fog nuclei by oxidation have been used as extremely effective storage stabilization agents. However, use of the mercury compounds is problematic in terms of safety and preservation of the environment.

The techniques for antifogging and image stabilization basically focuses on preventing the reaction which reduces the silver ions and produces silver atoms or metal silver, and oxidizing and removing silver (metallic silver that is unintentionally produced) or preventing the metallic silver from functioning as a catalyst for the reaction for reducing silver ions at the time of storage prior to development and at the time of storage after development.

The anti-fogging agent and image stabilizer used in dry imaging material of silver salt photothermographic of this invention are described more specifically in the following.

The silver salt photothermographic dry imaging material of this invention, is characterized by the use of mainly bisphenols as the reducing agent for the silver ions as described hereinafter. However, it is preferable that a compound that can deactivate the reducing agent is under the storage conditions for the imaging material prior to development, as well as under the storage conditions after development. A compound that can prevent the phenoxyl radical from being generated or a compound that can trap the phenoxyl radical so that it does not function as a reducing agent for the silver ions is preferable. Examples of favorable compounds having this type of effect/function are an irreducible compound having a group that can form a hydrogen bond with the hydroxide group of the bisphenol such as a phosphoryl group, a sulfoxide group, a sulfonyl group, a carbonyl group, an amide group, a ester group, a urethane group, a ureide group, a tertiary amine group, and a nitrogen-containing aromatic group. Particularly favorable are compounds including a sulfonyl group, a sulfoxide group, and a phosphoryl group. Specific examples are disclosed in the specifications of Japanese Patent Application Laid-Open No. 6-208192, No. 2001-215648, No. 350235, No. 2002-6444, and No. 2002-18264. In addition, special compounds containing a vinyl group are disclosed in Japanese Patent Application Laid-Open No. 2000-515995, No. 2002-207273 and No. 2003-140298.

A compound obtained by oxidizing silver (metallic silver) such as compounds which oxidize silver by releasing halide radicals having oxidizing power or compounds which interact and forms a charge-transfer complex may be used. Specific examples of compounds having these functions are disclosed in Japanese Patent Application Laid-Open Nos. 50-120328, 59-57234, 4-232939, 6-208193, 10-197989 and U.S. Pat. No. 5,460,938, and Japanese Patent Application Laid-Open No. 7-2781. In the imaging material in this invention in particular, specific examples of preferable compounds are halogen radical discharging compounds which can be represented by the general formula (OFI) which is given below.

$$Q_2\text{-}Y\text{—}C\,(X_1)\,(X_3)\,(X_2) \qquad \text{General formula (OFI)}$$

In the general formula (OFI), $Q_2$ represents an aryl group or a heterocyclic group. $X_1$, $X_2$ and $X_3$ respectively a hydrogen atom, a halogen atom, an acyl group, an alkoxycarbonyl group, an aryloxycarbonyl group, a sulfonyl group, and an aryl group, but at least one is an halogen atom. Y represents —C(═O)—, —SO— or —$SO_2$—.

The amount of the compound represented by the general formula (OFI) that is used is preferably $1\times10^{-4}$-1 mol and more preferably $1\times10^{-3}$-$5\times10^{-2}$.

It is to be noted that in the imaging material of this invention, the polyhalide disclosed in Japanese Patent Application Laid-Open No. 2003-5041 can be used in the same manner as the compound represented by the general formula (OFI). Specific examples of the compound represented by the general formula (OFI) include OFI-1-63 disclosed in paragraphs (0128) to (0135) disclosed in the specification of Japanese Patent Application No. 2003-320555.

[Polymer PO Inhibitor]

In addition, in the photothermographic imaging material of this invention, a polymer having at least one repeating unit of a monomer having a halogen radical releasing group such as that disclosed in Japanese Patent Application Laid-Open No. 2003-91054 may be used as the image stabilizer. However, in addition to single layer stabilization of the silver image, this is favorable in view of high sensitivity and high CP. In particular, more favorable effects than expected are obtained in the imaging material for the photothermographic of this invention. Specific examples of the polymer including the halogen radical releasing group are XP1-10 described in paragraph Nos. (0138)-(0141) of the specification of Japanese Patent Application No. 2003-320555.

It is to be noted that aside from the above-described compounds, compounds conventionally known as antifogging agents can also be included in the dry imaging silver salt photothermographic material of this invention. Examples include the compounds disclosed in U.S. Pat. Nos. 3,589,903, 4,546,075, 4,452,885, Japanese Patent Application Laid-Open No. 59-57234, U.S. Pat. Nos. 3,874,946, 4,756,999, Japanese Patent Application Laid-Open Nos. 9-288328, and 9-90550. In addition, other antifogging agents include those disclosed in U.S. Pat. No. 5,028,523 and European Patent Nos. 600,587, 605,981 and 631,176.

[Polycarboxyl Compound]

The compound represented by the following general formula (PC) is preferably used in the imaging material of this invention as an antifogging agent and a storage stabilizing agent.

$R—(CO—O\text{-}M_1)_n$ General Formula (PC)

In the formula, R represents an atom capable of bonding, an aliphatic group, an aromatic group, a heterocyclic group or atom groups which can bond which each other to form a ring. $M_1$ represents a hydrogen atom, a metal atom, a quaternary ammonium group or a phosphonium group. n represents an integer from 2-20.

In addition, the general formula (PC) has the effect of an oligomer or a polymer $(R—COOM_1)_{n1})_{m1}$. It is preferable that n1 is 2-20 and m1 is 1-100 and that the molecular weight is 50,000 or less.

Acid anhydrides of the compound represented by the general formula (PC) of this invention are also effective and are formed by a dehydration reaction of the two carboxyl groups represented by the general formula (PC). Acid anhydrides which have 3-10 carboxyl groups and derivatives thereof are preferable.

The acid anhydride may be favorably used together with the carboxylic acids described in Japanese Patent Application Laid-Open Nos. 58-95338, 10-288824, 11-174621, 11-218877, 2000-10237, 2000-10236, 2000-10235, 2000-10233, 2000-10232, and 2000-10231.

[Thiosulfonic Acid Inhibitor]

It is preferable that the compound represented by the general formula (ST) below is included in the imaging material of this invention.

$Z\text{-}SO_2.S\text{-}M_2$ General Formula (ST)

In the formula, Z represents a substituted or unsubstituted alkyl group, an aryl group, or a heterocyclic group, and $M_2$ represents a metal ion or an organic cation.

Specific examples of the compound represented by general formula (ST) are ST-1-40 described in paragraphs (0155)-(0157) of the specification of Japanese Patent Application No. 2003-320555.

The compound represented by general formula (ST) may be added at any point in the processes prior to the coating process in the process of preparing the imaging material of this invention, but it is preferably added immediately before the coating.

The addition amount of the compound represented by general formula (ST) is not particularly limited, but is preferably in the range of $1\times10^{-6}$-1 g of the total amount of silver contained in the organic silver salt and the silver halide.

It is to be noted that similar compounds are disclosed in Japanese Patent Application Laid-Open No. 8-314059.

[Vinyl Inhibitor Containing an Electron-Attracting Group]

The antifogging agent represented by the general formula (CV) below which is described in the specification of Patent Application No. 2003-320555 is preferably included in the present invention.

[Formula 1]

General formula (CV)

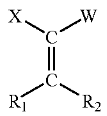

In the formula, X represents an electron attracting group; W represents a hydrogen atom, an alkyl group, an alkenyl group, an alkinyl group, aryl group, a heterocyclic group, a halogen atom, a cyano group, an acyl group, a thioacyl group, an oxalyl group, an oxyoxalyl group, an —S-oxalyl group, an oxamoyl group, an oxycarbonyl group, an —S carbonyl group, a carbamoyl group, a thiocarbamoyl group, a sulfonyl group, a sulfinyl group, an oxysulfonyl group, —S-sulfonyl group, a sulfamoyl group, an oxysulfinyl group, an —S-sulfinyl group, a sulfinamoyl group, a phosphoryl group, a nitro group, an imino group, N-carbonyl imino group, N-sulfonyl imino group, an ammonium group, a sulfonium group, a phosphonium group, a pyrylium group, or an inmonium group; $R_1$ represents a hydroxyl group or a salt of a hydroxyl group; $R_2$ represents an alkyl group, an alkenyl group, an alkinyl group, aryl group, or a heterocyclic group. X and W may also bond with each other to form a ring shaped structure. It is to be noted that X and $R_1$ are shown in a cis form but X and $R_1$ may also have a trans form.

Specific examples of the compound shown in general formula (CV) are CV-1 to 136 which are described paragraph numbers (0192)-(0203) in the specification of Japanese Patent Application No. 2003-320555.

The compound represented by general formula (CV) should be included in at least one of the light sensitive layer of the thermally developing light-sensitive material or the light-insensitive layer at said light-sensitive layer side. The amount of the compound represented by general formula (1) to be added is preferably $1\times10^{-8}$-1 mol per mol of silver, more preferably $1\times10^{-6}$-$1\times10^{-1}$ mol and most preferably $1\times10^{-4}$-$1\times10^{-2}$ mol.

The compound represented by general formula (CV) may be added to the light-sensitive layer or the light-insensitive layer using any known method. That is to say, the compound may be dissolved in an alcohol such as methanol or ethanol, a ketone such as methylethyl ketone or acetone, or a polar solvent such as dimethyl sulfoxide or dimethyl formamide and the like and added to the coating solution for the light-sensitive layer or the light-insensitive layer. Grains of 1 μm or less can be formed and dispersed in water or an organic solvent and then added. A large number of grains dispersion techniques have been disclosed and dispersion can be performed based on these.

[Silver Ion Reducing Agent]

Examples of compounds that may be used as the silver ion reducing agent (simply reducing agent hereinafter) of this invention include phenol compounds described in the specifications of U.S. Pat. Nos. 3,589,903 and 4,021,249 and British Patent No. 1,486,148 and Japanese Patent Application Laid-Open Nos. 51-51933, 50-36110, 50-116023 and 52-84727 or Examined Japanese Patent Publication No. 51-35727, bisnaphtols such as 2,2'-dihydroxy-1, 1'-binaphtyl, 6,6'-dibromo-2,2'-dihydroxy-1,1'-binaphtyl described in the specification of U.S. Pat. No. 3,672,904 as well as sulfonamido phenols or sulfanamido naphtols such as 4-benzenesulfonamido phenol, 2-benzenesulfonamido phenol, 2,6-dichloro-4-benzene sulfonamide phenol, 4-benzene sulfonamide naphtol and the like which are described in the specification of U.S. Pat. No. 3,801,32.

However, it is favorable that the compound represented by the general formula (RED) below may be used as the silver ion reducing agent in this invention.

[Formula 2]

General formula (RED)

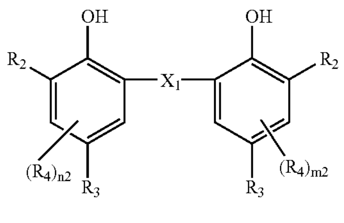

$X^1$ in the formula represents a chalcogen atom or $CHR^1$, and $R^1$ is a hydrogen atom, a halogen atom, an alkyl group, an alkenyl group, an aryl group or a heterocyclic group. $R^2$ represents an alkyl group and $R^3$ represents a group that is substitutable with a hydrogen atom or a benzene ring. $R^4$ represents a group that is substitutable on a benzene ring, and m2 and n2 each represents an integer from 0-2.

Specific examples of compounds represented by the general formula (RED) are RED-1 to 21 described in paragraphs (0226)-(0228) of the specification of Japanese Patent Application No. 2003-320555.

The amount of silver ion reducing agent used in the photothermographic dry imaging material in this invention varies in accordance with the type of the organic silver salt and the reducing agent and other additives, but generally, 0.05 mol to 10 mol per mol of the organic silver salt, and preferably 0.1 mol to 3 mol is suitable. In addition 2 or more types of the silver ion reducing agent of this invention may be used together in a quantity within this range. That is to say, using the silver ion reducing agent together with a reducing agent having different reactivity due to different chemical structures is favorable in view of obtaining an image with excellent storage stability, high image quality and high CP.

In this invention, adding the reducing agent to a light-sensitive emulsion comprising light-sensitive silver halide, organic silver salt grains and a solvent immediately before coating so that the variation of photographic performances due to the standing time is minimized.

In addition, the hydrazine derivative and the phenol derivative represented by general formulas (1)-(4) of Japanese Patent Application Laid-Open No. 2003-43614 publication and general formulas (1)-(3) in Japanese Patent Application Laid-Open No. 2003-66559 publication are preferably used as the development promoter used together with the reducing agent in the thermally developing light sensitive material of this invention.

It is to be noted that each type of reducing agent disclosed in European Patent No. 1,278,101 and Japanese Patent Application Laid-Open No. 2003-15252 may be used as the silver ion reducing agent of this invention.

The amount of the silver ion reducing agent used in the photothermographic dry imaging material in this invention varies in accordance with the type of the organic silver salt and the reducing agent and other additives, but generally, 0.05 mol to 10 mol per mol of the organic silver salt, and preferably 0.1 mol to 3 mol is suitable. In addition, 2 or more types of the silver ion reducing agent of this invention may be used together in a quantity within this range. That is to say, using the silver ion reducing agent together with a reducing agent having different reactivity due to different chemical structures is favorable in view of excellent storage stability, high image quality and obtaining a CP image.

In this invention, adding the reducing agent to a light-sensitive emulsion comprising light-sensitive silver halide, organic silver salt grains and a solvent immediately before coating and then performing coating sometimes causes less variation in photographic capability due to dead time and is therefore favorable.

[Chemical Sensitizer]

The light-sensitive silver halide grains of this invention may be subjected to chemical sensitization. For example, a chemical sensitization center (chemical sensitization nuclei) can be formed by utilizing compounds which release chalcogens such as sulfur, selenium and tellurium or noble metal compounds which release noble metal ions such as gold ions using methods described in Japanese Patent Application Laid-Open No. 2001-249428 and Japanese Patent Application Laid-Open No. 2001-249426 and capturing an electron or positive hole which is generated by light excitation of light-sensitive silver halide grains or spectral sensitizing dye on the grains due. It is particularly favorable for chemical sensitization to be performed by organic sensitizers including chalcogen atoms.

The organic sensitizers including the chalcogen atoms are preferably compounds which have a group capable of adsorbing to silver halides and an unstable chalcogen atom site.

Organic sensitizers having various structures disclosed in Japanese Patent Application Laid-Open Nos. 60-150046, 4-109240, 11-218874, 11-218875, 11-218876, and 11-194447 can be used, but of these, at least one type of compound having a structure in which a chalcogen atom is bonded to a carbon atom or a phosphorous atom by a double bond is preferable. In particular, a thiourea derivative having a heterocyclic group and a triphenyl phosphinesulfide derivative are preferable.

The method for performing the chemical sensitizing may use the techniques of various chemical sensitizing technologies commonly used when producing the silver halide light-sensitive material for conventional wet processing. (Reference Documents: (1) T. H. James "The Theory of the Photographic Process" Fourth edition, Macmillan Publishing Co., Ltd. 1977 (2) Japan Photography Society, "Foundations of Photographic Process (Silver Salt Photography" Corona 1979). In particular, in the case where the silver halide grains emulsion is subjected to chemical pre-sensitizing and then mixed with light-insensitive organic silver salt grains, chemical sensitization using the commonly used methods of the prior art can be performed.

The amount of the chalcogen compound which is the organic sensitizer that is used varies in accordance with the chalcogen compound and silver halide grains that are used, as well as the reaction conditions at the time the chemical sensitization is carried out. However, the amount is preferably $10^{-8}$-$10^{-2}$ mol per mol of silver halide and more preferably $10^{-7}$-$10^{-3}$ mol. The conditions for performing the chemical sensitization are not particularly limited, but it is preferable that chalcogen sensitization is performed using an organic sensitizer containing chalcogen atoms in the presence of a compound that can eliminate the chalcogenated silver on the light-sensitive silver halide grains or the silver nuclei or reduce the size thereof, or particularly in the presence of an oxidizing agent which can oxidize the silver nuclei. In this case, the conditions for performing the sensitization are pAg of preferably 6-11, and more preferably 7-10; pH of preferably 4-10 and more preferably 5-8; and temperature of 30° C. or less.

Further, it is preferable that chemical sensitization, employing said organic sensitizers, be carried out in the presence of either spectral sensitizing dyes or compounds containing heteroatoms, which exhibit said adsorption onto silver halide grains. By performing the chemical sensitization in the presence of a compound which can adsorb onto silver halide, dispersion of the chemical sensitizing center nuclei is prevented and high sensitivity and low fogging is achieved. The spectral sensitizing dye will be described hereinafter, but preferable examples are the heterocyclic compounds including nitrogen described in Japanese Patent Application Laid-Open No. 3-24537. Examples of the heterocyclic ring in the heterocyclic compound containing nitrogen include, a pyrazole ring, a pyrimidine ring, a 1,2,4-triazole ring, a 1,2,3-triazole ring, a 1,3,4-thiadiazole ring, a 1,2,3-thiadiazole ring, a 1,2,4-thiadiazole ring, a 1,2,5-thiadiazole ring, a 1,2,3,4-tetrazole ring, a pyridazine ring, a 1,2,3-triazine ring, and a ring in which 2-3 of these rings are combined such as a triazolotriazole ring, diazaindene ring, triazaindene ring, pentaazaindene ring and the like. It is also possible to use heterocyclic rings such as a phthalazine ring, a benzimidazole ring, an indazole ring and a benzthiazole ring, which are formed by condensing a single heterocyclic ring and an aromatic ring.

Of these the azaindene rings are preferable and azaindene having a hydroxyl group as the substituent group, such as hydroxy triazaindene, tetrahydroxy azaindene, hydroxy pentaazaindene compounds and the like are more preferable.

The heterocycle ring may have substituent groups other than the hydroxyl group. Examples of the substituent group include an alkyl group, a substituted alkyl group, an alkylthio group, an amino group, a hydroxyamino group, an alkylamino group, a dialkylamino group, an arylamino group, a carboxyl group, an alkoxycarbonyl group, a halogen atom, a cyano group and the like.

The amount of the heterocyclic compound to be added varies within a wide range depending on the size and composition of the silver halide grains as well as other conditions, but the amount is generally in the range of $10^{-6}$-1 mol per 1 mol of silver halide, and more preferably $10^{-4}$-$10^{-1}$ mol.

The light-sensitive silver halide in this invention can use a compound that releases noble metal ions such as gold ions and the like to perform noble metal sensitization. For example, chloroaurates or organic gold compounds can be used as the gold sensitizer. It is to be noted that the chemical sensitizing technology disclosed in Japanese Patent Application Laid-Open No, 11-194447 may be referred to.

In addition, aside from the above-described sensitizing methods, a reducing sensitizing method may be used, and specific examples of the compounds for the reducing sensitization include ascorbic acid, thiourea dioxide, stannous chloride, hydrazine derivatives, boron compounds, silane compounds, polyamine compounds and the like. In addition reducing sensitization can be performed by maintaining the pH of the emulsion at 7 or more and the pAg at 8.3 or less and thereby ripening the emulsion.

In this invention, the silver halide grains that are to be chemically sensitized can be grains formed in the presence of aliphatic carboxylic acid silver salt or can be grains formed under conditions where the organic silver salt is not present, or alternatively a mixture of both grains.

In this invention, in the case where the surface of the light-sensitive silver halide grains are chemically sensitized, it is necessary for the effect of chemical sensitization to be substantially eliminated after the thermal development processing step. Substantially eliminating the effect of chemical sensitization herein, refers to reduction of the sensitivity of the imaging material obtained by the chemical sensitizing technology to 1.1 times or less of the sensitivity in the case where chemical sensitization is not performed after the thermal development processing step. It is to be noted that in order to eliminate the effects of chemical sensitization in thermal development processing, at the time of thermal development, a suitable amount of an oxidizing agent which can be broken down due to the oxidization reaction, such as the halogen radical releasing compound and the like must be included in the emulsion layer and/or the non-light sensitive layer of the imaging material. The amount of the oxidizing agent to be included is preferably adjusted using the oxidizing power, the reduction range for the chemical sensitizing effect and the like.

[Spectral Sensitizer]

The light-sensitive silver halide grains in this invention are preferably absorbed by a spectrally sensitive dye. Examples of the spectrally sensitive dyes that may be used include cyanine dyes, merocyanines, complex cyanine dye, complex merocyanine dye, holopolar cyanine dyes, styryl dyes, hemicyanine dyes, oxonol dyes, hemioxonol dyes and the like. Sensitizing dyes that can be used include those disclosed in Japanese Patent Application Laid-Open No. 63-159841, No. 60-140335, No. 63-231437, No. 63-259651, No. 63-304242 and No. 63-15245, U.S. Pat. Nos. 4,639,414, 4,740,455, 4,741,966, 4,751,175 and No. 4,835,096.

Examples of useful sensitizing dyes in this invention include those described or cited in Research Disclosure (abbreviated to RD hereinafter) Item 17643IV-A (December 1978, p. 23), Item RD18431 X (August 1978 p.437). It is particularly preferable that a sensitizing dye exhibiting spectral sensitivity suitable for the spectral characteristics of the light source of various kind of laser imager or scanner is used. For example, the compounds described in Japanese Patent Application Laid-Open No. 9-34078, No. 9-54409, and No. 9-80679 may be favorably used.

The cyanine dye is preferably a cyanine dye having a basic nucleus such as a thiazoline nucleus, an oxazoline nucleus, a pyrroline nucleus, a pyridine nucleus, an oxazole nucleus, a thiazole nucleus, a selenazole nucleus, and an imidazole nucleus and the like. In addition to the above basic nuclei, useful melocyanine dyes preferably include an acidic nucleus such as a thiohydantoin nucleus, a rhodanine nucleus, a oxazolizinedione nucleus, a thiazolinedione nucleus, a barbituric acid nucleus, a thiazolinone nucleus, a marononitryl nucleus and a pyrazolone nucleus and the like.

In this invention, sensitizing dyes exhibiting spectral sensitivity for infrared in particular can be used. Preferable for use as the infrared spectral sensitizing dye are those disclosed in U.S. Pat. Nos. 4,536,473, 4,515,888 and No. 4,959,294.

In the dry imaging material for silver salt thermal photography in this invention preferably includes at least one of the sensitizing dyes represented by the general formula (SD-1) and the sensitizing dyes represented by the general formula (SD-2) which are shown below and are described in the specification of Japanese Patent Application No. 2003-320555.

[Formula 3]

General formula (SD-1)

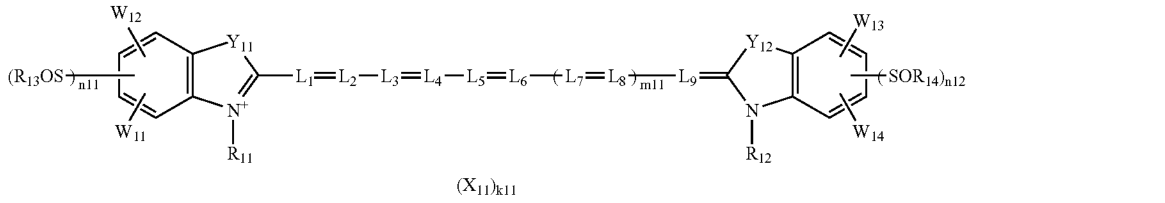

-continued

General formula (SD-2)

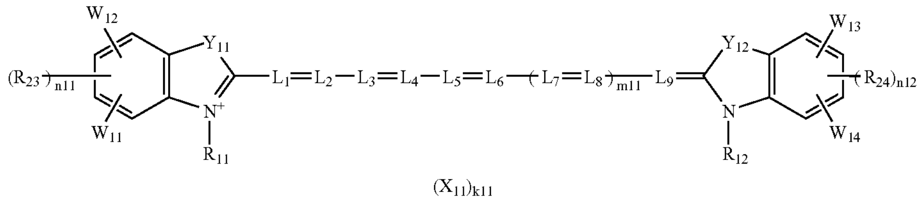

In the formula $Y_{11}$ and $Y_{12}$ respectively represent an oxygen atom, a sulfur atom, a selenium atom or the —CH═CH— group, and $L_1$-$L_9$ respectively represent a methine group. $R_{11}$ and $R_{12}$ respectively represent an aliphatic group. $R_{13}$, $R_{14}$, $R_{23}$ and $R_{24}$ respectively represent a short chain alkyl group, a cycloalkyl group, an alkenyl group, an aralkyl group, an aryl group or a heterocyclic group. $W_{11}$, $W_{12}$, $W_{13}$, and $W_{14}$ respectively represent a hydrogen atom, or a substituent group, or alternatively represent a non-metal atom necessary for forming a bond between $W_{11}$ and $W_{12}$, and $W_{13}$ and $W_{14}$ and forming a condensed ring. Alternatively, they may represent a non-metal atom group necessary for forming a condensed ring having 5 or 6 members by forming a bond between $R_{13}$ and $W_{11}$, $R_{13}$ and $W_{12}$, $R_{23}$ and $W_{11}$, $R_{23}$ and $W_{12}$, $R_{14}$ and $W_{13}$, $R_{14}$ and $W_{14}$, $R_{24}$ and $W_{13}$, $R_{24}$ and $W_{14}$. $X_{11}$ represents an ion necessary for negating the charge within the molecule. $k_{11}$ represents an ion necessary for negating the charge within the molecule. m11 is 0 or 1. n11 and n12 respectively are 0, 1 or 2. However n11 and n12 cannot both be 0 at the same time.

The infrared sensitizing dye can be easily synthesized using the methods described in F. M. Hammer, The Chemistry of Heterocyclic Compounds, Volume 18 and The Cyanine Dyes and Related Compounds (A Weissberger ed., Published by Interscience, New York 1964).

The time for the addition of the infrared sensitizing dye can be a suitably selected time after the preparation of the silver halide, and for example may be added in a solution, or alternatively may be dispersed in a so-called particulate state and added to silver halide grains or to light sensitive emulsion including silver halide grains/aliphatic carboxylic acid silver salt grains. In addition, as is the case with the heteroatom compound which adsorbs onto silver halide grains, chemical sensitizing may be performed after the silver halide grains have been added and the compound is adsorbed thereto. As a result, dispersion of the chemical sensitizing center nuclei is prevented and high sensitivity and low fogging is achieved.

In this invention, the one type of the spectral sensitizing dye may be used singly, but it is preferable that multiple types of spectral sensitizing dyes are combined and used as described above. Combinations for these sensitizing dyes are used repeatedly with the goal of super sensitization and expansion or adjustment of light-sensitive wavelength region.

In light-sensitive emulsion including silver halide and aliphatic carboxylic acid silver salt used in the silver salt photothermographic dry imaging material of this invention, a sensitizing dye that does not have a spectral sensitizing effect or does not substantially absorb visible light, and a substance that exhibits supersensitization may be included in the emulsion together and the silver halide grains will thereby be supersensitized.

Useful sensitizing dyes, combination of dyes exhibiting supersensitization and substances showing color sensitization are described in RD17643 (Published December, 1978) Page 23, Item IVJ, or Japanese Patent Application Laid-Open No. 9-25500, Japanese Patent Application Laid-Open No. 43-4933, Japanese Patent Application Laid-Open No. 59-19032, Japanese Patent Application Laid-Open No. 59-192242, and Japanese Patent Application Laid-Open No. 5-341432, but the supersensitizer is preferably one of the complex aromatic mercapto compound or a mercapto derivative compound shown below.

$$Ar—SM_3$$

In the formula, $M_3$ is a hydrogen atom or an alkali metal ion and Ar is an aromatic ring or a condensed aromatic ring including one or more nitrogen, sulfur, oxygen, selenium, or terellium atoms. The heterocyclic aromatic ring is preferably benzimidazole, naphthimidazole, benzthiazole, naphtothiazole, benzoxazole, naphtoxazole, benzselenazole, benztellurazole, imidazole, oxazole, pyrazole, triazole, triazine, pyrimidine, pyridazine, pyrazine, pyridine, purine, quinoline, or quinazoline. However, other heterocyclic aromatic rings may be included.

Further, when the compound is incorporated in the dispersion of silver aliphatic carboxylate and a silver halide grain emulsion, the mercapto derivative compounds essentially forming the mercapto compounds described above are also given as examples. The mercapto derivative compounds shown below in particular, are preferable examples.

$$Ar—S—S—Ar$$

In the formula, Ar is the same as in the case of the mercapto compound shown above.

Examples of the hetero-aromatic cycle include those having a substituent group selected from the group comprising a halogen atom (such as chlorine, bromine or iodine), a hydroxyl group, an amino group, a carboxyl group, an alkyl group (such as those having one or more carbon atoms and preferably 1-4 carbon atoms) and an alkoxy group (such as those having one or more carbon atoms and preferably 1-4 carbon atoms.)

In addition to the above supersensitizers, the macrocyclic compounds having a heteroatom which are disclosed in Japanese Patent Application Laid-Open No. 2001-330918 may also be used as the super sensitizer.

0.001-1 mol of the supersensitizer of this invention is preferably used for 1 mol of silver in the light-sensitive layer including the organic silver salt and the silver halide grains. An amount of 0.01-0.5 mol per mol of silver is particularly preferable.

In this invention, when a spectral sensitizing dye is absorbed at the surface of the light-sensitive silver halide grains to perform spectral sensitization, it is necessary for the effect of spectral sensitization to be substantially eliminated after the thermal development processing step. Substantially eliminating the effect of spectral sensitization herein, refers to reduction of the sensitivity of the imaging material obtained by the sensitizing dye, the supersensitizer and the like to 1.1 times or less of the sensitivity in the case where spectral sensitization is not performed after the thermal development processing step. It is to be noted that in order to eliminate the effects of chemical sensitization in thermal development processing, at the time of thermal development, a suitable amount of a spectral sensitizing dye which can separate from the silver halide grains due to heat and/or an oxidizing agent which can be break down the spectral sensitizing dye due to the oxidization reaction, such as the halogen radical releasing compound and the like must be included in the emulsion layer and/or the light-insensitive layer of the imaging material. The amount of the oxidizing agent to be included is preferably adjusted using the oxidizing power, the reduction range for the chemical sensitizing effect and the like.

[Silver Saving Agent]

In this invention, a silver saving agent may be included in the light-sensitive layer or in the light-insensitive layer.

Silver saving agent used in this invention refers to compounds which reduces the silver amount necessary to obtain a definite silver image density. There are various mechanisms for effecting the silver saving function, but the compound preferably has the function of improving the covering power of the developed silver. The covering power of the developed silver herein refers to the optical density per unit amount of silver. The silver saving agent may be present in the light-sensitive layer or the light-insensitive layers or in both of these layers.

Preferable examples of the silver saving agent include the hydrazine derivative shown in the general formula (H) below, the vinyl compound shown in the general formula (G) below, the quaternary onium compound shown in (P) below and the like.

[Formula 4]

General formula (H)

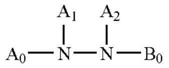

General formula (G)

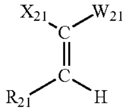

General formula (P)

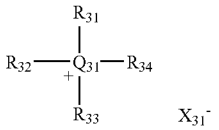

In the general formula (H) $A_0$ represents an aliphatic group, and aromatic group, or a heterocyclic group or $-G_0-D_0$ group, each of which may have substituents, $B_0$ represents a blocking group, $A_1$ and $A_2$ each represents an hydrogen atom, or one may represent an hydrogen atom and the other represents acyl group, sulfonyl group, or oxaryl group. $G_0$ represents —CO— group, —COCO— group, —CS— group, $—C(=NG_1D_1)$ group, —SO— group, $—SO_2—$ group, or $—P(O)(G_1D_1)$ group and $G_1$ represents a single bond —O— group, —S— group or a $—N(D_1)$-group. $D_1$ represents an aliphatic group, an aromatic group, a heterocyclic group, or a hydrogen atom and in the case where there are multiple $D_1$ present in the molecule, they may be same or different. $D_0$ represents a hydrogen atom, aliphatic group, aromatic group, a heterocyclic group, an amino group, an alkoxy group, an aryloxy group, an alkylthio group, or an arylthio group. Preferable examples of $D_0$ are a hydrogen atom, an alkyl group, an alkoxy group, an amino group and the like.

In the general formula (G), $X_{21}$ and $R_{21}$ are shown in a cis form, but $X_{21}$ and $R_{21}$ having the trans form are also included. This is also the case for the structural display of the specific compounds.

In the general formula (G), $X_{21}$ represents an electron-attracting group, $W_{21}$ is a hydrogen atom, an alkyl group, an alkenyl group, an aryl group, a heterocyclic group, a halogen group, an acyl group, a thioacyl group, an oxalyl group, an oxyoxalyl group, a thiooxalyl group, an oxamoyl group, an oxycarbonyl group, a thiocarbonyl group, a carbambyl group, a thiocarbamoyl group, a sulfonyl group, a sulfinyl group, an oxysulfinyl group, a thiosulfinyl group, a sulfamoyl group, an oxysulfinyl group, a thiosulfinyl group, a sulfinamoyl group, a phosphoryl group, a nitro group, an imino group, an N-carbonyl imino group, an N-sulfonyl imino group, a dicyano ethylene group, an ammonium group, a sulfonium group, a phosphonium group, a pyrilium group, and an immonium group.

$R_{21}$ represents a halogen atom, a hydroxyl group, an alkoxy group, an aryloxy group, a heterocyclic oxy group, an alkenyloxy group, an acyloxy group, an alkoxycarbonyloxy group, an aminocarbonyloxy group, a mercapto group, an alkylthio group, an arylthio group, a heterocyclic thio group, an alkenylthio group, an acylthio group, an alkoxycarbonylthio group, an aminocarbonylthio group, an inorganic or organic salt (such as sodium salt, potassium salt, silver salt and the like) of a hydroxyl group or a mercapto group, an amino group, an alkyl amino group, a cyclic amino group (such as a pyrrolidino group), an acyl amino group, an oxycarbonyl amino group, a heterocyclic group (a 5-6 member nitrogen-containing heterocyclic ring such as a benztriazolyl group, an imidazole group, a triazolyl group, a tetrazolyl group and the like), a ureide group, and a sulfonamide group. $X_{21}$ and $W_{21}$, and $X_{21}$ and $R_{21}$ may bond with each other to form a ring structure. Examples of the ring formed by $X_{21}$ and $W_{21}$ include pyrazolone, pyrazolidinon, cyclopentanzione, β-ketolactone, β-ketolactum and the like.

In the general formula (P), $Q_{31}$ represents a nitrogen atom or a phosphor atom and $R_{31}$, $R_{32}$, $R_{33}$, and $R_{34}$ each represents a hydrogen atom or a substituent group and $X_{31}$ represents an anion. It is to be noted that $R_{31}$-$R_{34}$ may bond with each other to form a ring.

The amount of the above silver saving agent added is preferably in the range of $10^{-5}$-1 mol for 1 mol of aliphatic carboxylic acid silver salt, and more preferably in the range $10^{-4}$-$5\times10^{-1}$.

In this invention, it is preferable that at least one type of the silver saving agent is a radical compound. The radical compound used as the silver saving agent in this invention is preferably an alkoxysilane compound or a salt thereof having two or more primary or secondary groups, such as those disclosed in the specification of Japanese Patent Application Laid-Open No. 2003-5324.

The amount of the alkoxysilane compound or the salt thereof or the cif salt group used as the silver saving agent which is added to the image forming layer is preferably usually in the range of 0.0001-0.5 mol. In addition, the range is the same in the case where both the alkoxysilane compound or the salt thereof and the cif salt group are added to the image forming layer.

[Binder]

The binders that may be suitably used in the dry imaging silver salt photothermographic material of this invention are transparent or translucent and are generally colorless, and include natural polymers, synthetic resins polymers and copolymers and media to form films. Examples include gelatin, gum Arabic, poly(vinyl alcohol), hydroxyethyl cellulose, cellulose acetate, cellulose acetate butylate, poly(vinyl pyrrolidone), casein, starch, poly(acrylic acid), poly(methyl metacrylic acid), poly(vinyl chloride), poly(metacrylic acid), copoly(styrene-maleic acid anhydride), copoly(styrene-acrylonitryl), copoly (styrene-butadiene), poly(vinyl acetals) such as poly(vinylformals) and poly(vinylbutyrals), poly(esters), poly(urethanes), phenoxy resin, poly(vinylidene chlorides), poly(epoxides), poly(carbonates), poly(vinyl acetates), cellulose esters, and poly(amides). These may be hydrophilic or hydrophobic.

The binder preferably used in the light-sensitive layer of the dry imaging silver salt photothermographic material of this invention is a polyvinyl acetal and a polyvinyl butyral is more preferable. Details will be given hereinafter. In addition, for the light-insensitive layers such as the overcoat layer, the undercoat layer, and in particular the protective layer or the backing coat layer and the like, polymers with a higher softening point such as cellulose esters and in particular, triacetyl cellulose and cellulose acetate butylate are preferable. It is to be noted that two or more of the above binders may be combined as necessary.

These binders are used in the range for effectively functioning as a binder. The effective range can be easily determined by one skilled in the art. For example, the guideline for maintaining at least the aliphatic carboxylic acid silver salt in the light-sensitive layer is preferably in the range for the proportion of the binder and the aliphatic carboxylic acid silver salt of 15:1-1:2 and a range of 8:1-1:1 is particularly preferable. That is to say the binder amount for the light-sensitive layer is preferably 1.5-6 $g/m^2$ and more preferably 1.7-5 $g/m^2$. If the amount is less than 1.5 $g/m^2$ the density of the unexposed portions increases considerably and the material is sometimes unusable.

In this invention, the thermal transition point temperature after development processing is performed at 100° C. or higher is preferably between. 46° C. and 200° C., and more preferably between 70° C. and 105° C. The thermal transition point temperature is a value shown by the VICAT softening point or the value shown by the ball and ring method, and indicates the heat absorption peak which is obtained by measuring the developed light-sensitive layer that has been individually separated using a differential scanning calorimeter (DSC) such as EXSTAR 6000 (manufactured by Seiko Electronics), DSC220C (manufactured by Seiko Electronics), DSC-7 (Manufactured by Perkin-Elmer Co.). Generally, polymer compounds have a glass transition point Tg, but in the dry imaging silver salt photothermographic material, for the area where the glass transition point is lower than the Tg value of the binder resin used in the light-sensitive layer, a large heat absorption peak is shown. As a result of doing diligent studies paying close attention to this transition point temperature, it was discovered that by adjusting the transition point temperature to be in the range 46° C. and 200° C., not only is the durability of the coating film increased, but other photographic characteristics such as sensitivity, maximum density, image storage stability and the like are considerably improves. The present invention was achieved in view of this discovery.

The glass transition temperature (Tg) is determined from the methods disclosed in Brandlap et al. "Polymer Handbook" Page III-139 to Page III-179 (1966, Published by Wily and Son), and in the case where the binder is a copolymer, Tg is determined from the formula below.

$$Tg\ (copolymer)\ (°\ C.)=v_1Tg_1+v_2Tg_2+\ldots+v_nTg_n$$

[In the formula, $v_1, v_2 \ldots v_n$ represent the weight ratio of the monomers in the copolymer and $Tg_1, Tg_2 \ldots Tg_n$ represent the Tg (° C.) of the homopolymer obtained from each of the monomers in the copolymer.] It is to be noted that the accuracy of the Tg calculated by the above formula is ±5° C.

In the dry imaging silver salt photothermographic dry imaging material of this invention, known prior art polymer compounds may be used as the binder included in the light-sensitive layer comprising the aliphatic carboxylic acid silver salt on a support. These polymer compounds have a Tg of 70-105° C., and a number average molecular weight of 1,000-1,000,000 and more preferably 10,000-500,000 and a degree of polymerization of approximately 50-1,000. Examples of these compounds are those formed of polymers or copolymers including ethylene-based unsaturated monomers as the structural units such as vinyl chloride, vinyl acetate, vinyl alcohol, maleic acid, acrylic acid, acrylic acid esters, vinylidene chloride, acrylonitryl, metacrylic acid, metacrylic acid ester, styrene, butadiene, ethylene, vinyl butyral, vinyl acetal, and vinyl ether, as well as polyurethane resins and various types of rubber based resins.

Other examples include phenol resins, epoxy resins, polyurethane hard resins, urea resins, melamine resins, alkyd resins, formaldehyde resins, silicone resins, epoxy-polyamide resins, polyester resins and the like. These resins are described in detail in the "Plastic Handbook" published by Asakura Publishing Company. There are no particular limits to these polymer compounds, and the homopolymers or copolymers may be used as long as the glass transition temperature (Tg) of the derived polymer is in the range 70° C. -105° C.

Examples of the homopolymer or copolymer including the ethylene-based unsaturated monomer as the structural unit include acrylic acid alkyl esters, acrylic acid aryl esters, metacrylic acid alkyl esters, metacrylic acid aryl esters, cyano acrylic acid alkyl esters, cyano acrylic acid aryl esters, and the like, and their alkyl groups and aryl groups may or may not be substituted. Specific examples of these include, methyl, ethyl, n-propyl, isopropyl, n-butyl, isobutyl, sec-butyl, tert-butyl, amyl, hexyl, cyclohexyl, benzyl, chlorobenzyl, octyl, stearyl, sulfopropyl, N-ethyl-phenylaminoethyl, 2-(3-phenylpropyloxy)ethyl, dimethylaminophenoxyethyl, furfuryl, tetrahydrofurfuryl, phenyl, cresyl, naphtyl, 2-hydroxyethyl, 4-hydroxybutyl, triethylene glycol, dipropylene glycol, 2-methoxyethyl, 3-methoxybutyl, 2-acetoxyethyl, 2-acetoacetoxyethyl, 2-ethoxyethyl, 2-iso-propoxyethyl, 2-butoxyethyl, 2-(2-methoxyethoxy)ethyl, 2-(2-ethoxyetoxy)ethyl, 2-(2-butoxyethoxy)ethyl, 2-diphenylphosphorylethyl, ω-methoxypolyethylene glycol (added mole number n=6), aryl, dimethylaminoethylmethylchloride salts and the like.

In addition, the monomers and the like below can be used. Specific examples include vinyl esters such as vinyl acetate, vinyl propionate, vinyl butylate, vinyl isobutylate, vinyl caproate, vinyl chloroacetate, vinyl methoxyacetate, vinyl phenyl acetate, vinyl benzoate, vinyl salicylate and the like; N-substituted acrylamides, N-substituted metacrylamides, and acrylamide and metacrylamide with substituent groups of methyl, ethyl, propyl, butyl, tert-butyl, cyclohexyl, benzyl, hydroxymethyl, methoxyethyl, dimethylaminoethyl, phenyl, dimethyl, diethyl, β-cyanoethyl, N-(2-acetoacetoxyethyl), diacetone and the like; olefins such as dicyclopentadiene, ethylene, propylene, 1-butene, 1-pentene, vinyl chloride, vinylidene chloride, isoprene, chloroprene, butadiene, 2,3-dimethylbutadiene and the like; styrenes such as methylstyrene, dimethyl styrene, trimethylstyrene, ethylstyrene, isopropylstyrene, tert-butyl styrene, chlormethylstyrene, methoxystyrene, acetoxystyrene, chlorstyrene, dichlorstyrene, bromstyrene, methylester vinylbenzoate; vinyl ethers such as methylvinyl ether, butylvinyl ether, hexylvinyl ether, methoxyethylvinyl ether, dimethylaminoethylvinyl ether and the like; N-substituted maleimides with N-substituent groups of methyl, ethyl, propyl, butyl, tert-butyl, cyclohexyl, benzyl, n-dodecyl, phenyl, 2-methylphenyl, 2,6-diethylphenyl, 2-chlorphenyl and the like; and other examples include butyl crotonate, hexyl crotonate, dimethyl itaconate, dibutyl itaconate, diethyl maleate, dimethyl maleate, dibutyl maleate, diethyl fumarate, dimetyl fumarate, dibutyl fumarate, methyl vinyl ketone, phenylvinyl ketone, methoxyethylvinyl ketone, glycidyl acrylate, glycidyl metacrylate, N-vinyloxazolidon, N-vinyl pyrrolidon, acrylonitryl, metaacrylonitryl, methylene malonitryl, vinylidene chloride and the like.

Of these, particularly preferable examples are alkylester metacrylates, and aryl ester metacrylates, styrenes and the like. Of these polymer compounds, polymer compounds having an acetal group are more preferable because they exhibit excellent compatibility with the aliphatic carbonate that is formed, the effect of preventing film softening is large.

The compounds represented by the general formula (V) below are particularly preferable as the polymer compound containing an acetal group.

[Formula 5]

General Formula (V)

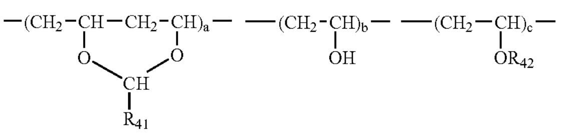

In the formula, $R_{41}$ represents an alkyl group, a substituted alkyl group, an aryl group or a substituted aryl group, but is preferably a group other than the aryl group. $R_{42}$ represents an unsubstituted alkyl group, a substituted alkyl group, an unsubstituted aryl group, a substituted aryl group, $—COR_{43}$ or $—CONHR_{43}$. $R_{43}$ and $R_{41}$ are the same.

The polyurethane resin which can be used in this invention are known polyurethane resins such as polyester polyurethane, polyether polyurethane, polyether polyester polyurethane, polycarbonate polyurethane, polyester polycarbonate polyurethane, and polycarprolactone polyurethane. For all the polyurethane represented here, it is favorable that the compound in which at least one or more polar group selected from among $—COOM_4$, $—SO_3M_4$, $—OSO_3M_4$, $—P{=}O(OM_4)_2$, $—O—P{=}O(OM_4)_2$ ($M_4$ represents a hydrogen atom or an alkali metal salt group) $—N(R_{44})_2$, $—N^+(R_{44})_3$ ($R_{44}$ represents a hydrocarbon group, and multiple $R_{44}$ may be the same or different), an epoxy group, —SH, —CN, are introduced by a copolymerization or addition reaction, are used as necessary. The amount of the polar group is $10^{-1}$-$10^{-8}$ mol/g and more preferably $10^{-2}$-$10^{-6}$ mol/g. Aside from these polar groups it is preferable that each end of the polyurethane molecule has at least one and a total of 2 or more OH group. The OH group cross-links with polyisothianate which is the hardener and forms a three-dimensional net structure, and thus multiple OH groups are preferably included in the molecule. In particular, it is preferable that the OH group is at the end of the molecule as the reactivity with the hardener is enhanced. It is preferable that there are 3 or more OH groups at the end of the molecule, and more preferable that there are 4 or more. In the case where polyurethane is used it is preferable that the glass transition temperature is 70-105° C. and the breakage elongation is 100-2000%, and the breakage force is 0.5-100 $N/m^2$.

These polymer compounds may be used singly as a binder, or two or more may be blended and used. The above polymers are used as the main binder in the layer including the light-sensitive silver salt of this invention (preferably the light-sensitive layer). The main binder herein refers to binder "for which the above polymers accounts for 50 percent by weight or more of the total weight of binders in the layer including the light-sensitive silver salt." Thus the other polymers may be blended and used in a range that is less the 50 percent by weight of all the binders. These polymers are not particularly limited provided that they are solvents which can dissolve the polymers of this invention. Preferable examples are polyvinyl acetate, polyacryl resin, urethane resin and the like.

The composition of the polymer compounds that are favorably used in this invention are shown below. It is to be noted that in the table, Tg is a value measured by the differential scanning calorimeter (DSC) manufactured by Seiko Electronics.

TABLE 1

| Polymer name | Acetoacetal mol % | Butyral mol % | Acetal mol % | Acetyl mol % | Hyroxide group mol % | Tg value (° C.) |
|---|---|---|---|---|---|---|
| P-1 | 6 | 4 | 73.7 | 1.7 | 24.6 | 85 |
| P-2 | 3 | 7 | 75.0 | 1.6 | 23.4 | 75 |
| P-3 | 10 | 0 | 73.6 | 1.9 | 24.5 | 110 |
| P-4 | 7 | 3 | 71.1 | 1.6 | 27.3 | 88 |
| P-5 | 10 | 0 | 73.3 | 1.9 | 24.8 | 104 |
| P-6 | 10 | 0 | 73.5 | 1.9 | 24.6 | 104 |
| P-7 | 3 | 7 | 74.4 | 1.6 | 24.0 | 75 |
| P-8 | 3 | 7 | 75.4 | 1.6 | 23.0 | 74 |
| P-9 | — | — | — | — | — | 60 |

It is to be noted that in Table 1, P-9 is polyvinylbutyl resin B-79 manufactured by Solutia Ltd.

Using a crossing linking agent for the above binders is known to improve film adhesion and reduce unevenness in the developed image, but it also has the effect of suppressing fogging at the time of storage and controlling printout silver formation after development.

The cross-linking agents used in this invention are various cross-linking agents used for silver halide photothermographic materials of the prior art. Examples include aldehyde based, epoxy based, ethyleneimide based, vinyl sulfon based, ester sulfonate based, acryloyl based, carbodiimide based, silane compound based cross-linking agents which are described in Japanese Patent Application Laid-Open No. 50-96216 for example. However the isocyanate compounds, silane compounds and epoxy compounds and acid anhydrides which are shown below are preferable.

The isothyanate based and thioisocyanate based cross-linking agent shown in the general formula [IC] which is one favorable cross-linking agent will be described in the following.

$$X_{21}{=}C{=}N\text{-}Lv_{21}\text{-}(N{=}C{=}X_{21}) \qquad \text{General Formula IC}$$

In the formula, $v_{21}$ is 1 or 2, $L_{21}$ is an alkyl group, and alkenyl group, an aryl group or an alkylaryl group and is a linking group having a valency of v+1 and $X_{21}$ is an oxygen or sulfur atom.

It is to be noted that in the compound [IC] shown in the above general formula, the aryl ring of the aryl group has a substituent group. Preferable examples of the substituent group may be selected from a halogen atom (such as a bromine atom or a chlorine atom), a hydroxyl group, an amino group, a carboxyl group, an alkyl group and an alkoxy group.

The isocyanate cross-linking agent is an isocyanate containing at least 2 isocyanate groups and an adduct thereof, and specific examples are aliphatic diisocyanates, aliphatic diisocyanates containing a ring group, bezene diisocyanates, naphthalene diisocyanates, biphenyl isocyanates, diphenylmethane diisocyanates, triphenylmethane diisocyanates, triisocyanates, tetraisocyanates, and adducts of these isocyanates and adducts with divalent and trivalent alcohols.

Specific examples of the isocyanate compounds that can be used are those described on pages 10-12 of Japanese Patent Application Laid-Open No. 56-5535.

It is to be noted that the adduct of the isocyanate and the polyalcohol are capable of remarkably improving adhesion between the layers in particular and of preventing stripping of the layer or image displacement and formation of air bubbles. The isocyanate may be disposed in any portion of the dry image material for silver salt thermal photography. For example, it may be added to the support (particularly when the support is paper, it may be included in a size composition), or to suitably selected layers at the light-sensitive layer side of the support such as the light-sensitive layer, surface protective layer, the middle layer, the anti-halation layer, and the undercoat layer. The adduct may be added to one or two or more of these layers.

The compounds having a thioisocyanate structure which correspond to the above isocyanates may also be used as the thioisocyanate cross-linking agent in this invention.

The amount of the cross-linking agent used in this invention is in the range of 0.001-2 mol per mol of silver and more preferably in the range of 0.005-0.5 mol.

The isocyanate compounds and the thioisocyanate compounds that can be included in this invention are preferably compounds that function as the above cross-linking agents, but good cross-linking effects may be obtained by compounds in which v21 is zero (0) in the above general formula, or in other words compounds which have only one of the functional groups.

Examples of radical compounds which can be used as the cross-linking agent in this invention are the compounds shown in general formula (1) or general formula (2) described in Japanese Patent Application Laid-Open No. 2002-22203.

Epoxy compounds which can be used as the cross-linking agent can be any one having one or more epoxy group, and the number of epoxy groups, molecular weight and so on is not limited. The epoxy group is preferably included in the molecule as a glycidyl group via an ether bond or an imino bond. In addition, an epoxy compound may be any of a monomer, oligomer, polymer and the like, and the number of epoxy groups present in the molecule is usually 1-10, and more preferably 2-4. In the case where the epoxy compound is a polymer, it may be a homopolymer or a copolymer, and the average molecular weight thereof is preferably in the range of 2000-20,000 in particular.

The compound is preferably a compound represented by the general formula (EP) below.

General Formula (1)

[Formula 6]

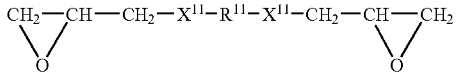

In the formula, $R^{11}$ represents a linking group, and preferably is an alkylene group that may have a substituent group, or has an amide linking portion, an ether linking portion, or a thioether linking portion. $X^{11}$ preferably represents a divalent linking group and is preferably —$SO_2$—, —$SO_2NH$, —S—, —O—, or $NR^{12}$. It is preferable that the $R^{12}$ herein is a monovalent, electron attracting group.

The epoxy compounds may be used singly, or two or more may be combined and used. The amount to be added is not particularly limited, and is preferably in the range of $1\times10^{-6}$-$1\times10^{-2}$ mol/$m^2$ and more preferably in the range of $1\times10^{-5}$-$1\times10^{-3}$ mol/$m^2$.

The epoxy compound is added to suitably selected layers at the light-sensitive side of the support such as the light-sensitive layer, surface protective layer, the middle layer, the anti-halation layer, and the undercoat layer and may be added to one or two or more of these layers. It may also be suitably added to the opposite side of the light-sensitive layer of the support. It is to be noted that the epoxy compound may be added to either layer in the type of photosensitive material in which a light sensitive layer is present at both surfaces.

The acid anhydride is a compound having at least one of the acid anhydride group represented by the structural formula below.

—CO—O—CO—

The acid anhydride can be any one having one or more acid anhydride groups, and the number of anhydride groups and molecular weight and so forth is not limited, but the compound is preferably represented by the general formula (SA) below.

[Formula 7]

General Formula (SA)

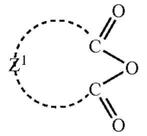

In the general formula (SA), $Z_1$ represents an atom group necessary for forming a monocyclic or polycyclic system. The ring system may be unsubstituted or substituted. Examples of the substituent group include an alkyl group (such as methyl, ethyl, hexyl), an alkoxy group (such as methoxy, ethoxy, octyloxy), an aryl group (such as phenyl, naphthyl, tolyl), a hydroxyl group, an aryloxy group (such as phenoxy), an alkylthio group (such as methylthio, butylthio), an arylthio group (such as phenylthio), an acyl group (such as acetyl, propionyl, butyryl), a sulfonyl group (such as methylsulfonyl, phenylsulfonyl), an acylamino group, a sulfonyl amino group, an acyloxy group (such as acetoxy, benzoxy), a carboxyl group, a cyano group, a sulfo group, and an amino group. The substituent group preferably does not include a halogen atom.

Only one of these acid anhydrides may be used, or 2 or more may be used together. The amount to be added is not particularly specified, but an amount in the range of $1\times10^{-6}$-$1\times10^{-2}$ mol/$m^2$ is preferable, and $1\times10^{-5}$-$1\times10^{-3}$ mol/$m^3$ is more preferable.

The acid anhydride in this invention to suitably selected layers at the light-sensitive layer side of the support such as the light-sensitive layer, surface protective layer, the middle layer, the anti-halation layer, and the undercoat layer, and may be added to one or two or more of these layers. The acid anhydride may also be added to the same layer as the epoxy compound.

[Tone Modifiers]

Next the tone of the image obtained by thermal processing of the photothermographic dry imaging material will be described.

With regard to color tone of output images for medical diagnosis such as the conventional radiograph film, it is thought that images with a cold tone allow the readers to obtain more accurate diagnostic observation results. Herein, a cold image tone means that the images are of pure black tone or of a blue-black tone in which black images have a tinge of blue, while a warm image tone means that black images have a warm black tone with a tinge of brown. In order to allow precise quantitative argument the description will be based on the expression method recommended by the Commission Internationale de l'Eclairage (CIE).

The terms "colder tone" and "warmer tone" for color tones can be expressed by a hue angle $h_{ab}$ at a minimum density Dmin and an optical density of D=1.0. That is to say, the hue angle $h_{ab}$ is determined by using a color coordinate a*, b* in L*a*b* color specification system defined in CIE 1976. L*a*b* color space was recommended by CIE (Commission Internationale de l'Eclairage) to exhibit a uniform gradation which is similar to human visual perception.

$$h_{ab}=\tan^{-1}(b^*/a^*)$$

Studies using the expression method based on the foregoing hue angle revealed that the hue subsequent to development of the photothermographic dry imaging material of this invention is preferably in the range 180 degrees$<h_{ab}<$270 degrees, more preferably 200 degrees$<h_{ab}<$270 degrees, and most preferably 220 degrees$<h_{ab}<$260 degrees. This is disclosed in Japanese Patent Application Laid-Open No. 2002-6463.

It is to be noted that it is known heretofore, that by adjusting the specific numerical value of u* and v* or a* and b* in L*u*v* color space or L*a*b* color space of CIE 1976 in the vicinity of optical density 1.0, images for diagnosis with favorable tone are obtained, and this is described in Japanese Patent Application Laid-Open No. 2000-29164.

However, in the photothermographic dry imaging material of this invention, more intensive studies were done and u* and v* or a* and b* for various photographic densities were plotted to create a linear regression line on a graph in which the horizontal axis is u* or a* and the vertical axis is v* or b* of the CIE 1976 (L*u*v*) color space or the (L*a*b*) color space. These studies revealed that by adjusting the linear regression line within a specific range, the photothermographic dry imaging material had diagnostic properties that were superior to that of the wet silver salt light-sensitive material of the prior art. The range of favorable conditions is described in the following.

1) The optical densities at 0.5, 1.0 and 1.5 and the densities for the minimum optical density are measured for the silver images obtained after the photothermographic dry imaging material is thermally processed. The regression line is formed by positioning u* and v* for each of the foregoing optical densities on the two dimensional coordinates in which u* is on the horizontal axis and v* is on the vertical axis of the CIE 1976 (L*u*v*) color space. The coefficients of determination for the linear regression line (determined by superposing) $R^2$ is preferably between 0.998 and 1.000 of the linear regression line.

The value at the crossing point v* of the linear regression line and the vertical axis is preferably between −5 and 5, and the gradient (v*/u*) is preferably between 0.7 and 2.5.

2) The optical densities at 0.5, 1.0 and 1.5 and the densities for the minimum optical density are measured for the photothermographic dry imaging material that is thermally processed. The regression line is formed by positioning a* and b* at each of the foregoing optical densities on the two dimensional coordinates in which a* is on the horizontal axis and b* is on the vertical axis of the CIE 1976 (L*u*v*) color space. The coefficients of determination for the linear regression line (determined by superposing) $R^2$ is preferably between 0.998 and 1.000 of the linear regression line.

The value at the crossing point b* of the linear regression line and the vertical axis is preferably between −5 and 5, and the gradient (b*/a*) is preferably between 0.7 and 2.5.

It is to be noted that the method for forming the abovementioned linear regression line is one example of the methods for measuring u*, v* and a*, b* in the CIE 1976 color space system.

A 4-level wedge sample containing an unexposed portion and optical densities of 0.5, 1.0, and 1.5 is produced using a thermal development device. Each of the wedge density portions that have been prepared in this manner is measured by a spectral calorimeter (For example CM-3600d manufactured by Minolta), and a*, b* or u*, v* are calculated. The measuring conditions at this time are such that the light source is a F7 light source, and the measurements are carried out in a transmission measurement mode with an angle of visibility of 10°. The measured u*, v* or a*, b* are plotted on a graph in which the horizontal axis is u* or a* and the vertical axis is v* or b*, and a linear regression line is obtained and the coefficient of determination (determination by superposing) $R^2$ and the section and gradient are obtained.

Next, the specific method for obtaining the linear regressive straight line having the above features will be described.

In this invention, the developed silver salt configuration can be optimized and to have a favorable tone by adjusting the amount of the compounds which are directly or indirectly involved in the development reaction process, the compounds being the toning agent, the developing agent, the silver halide salts and the aliphatic silver carbonate. For example, if the shape of the development silver is dendrite shaped, it tends to carry blue, while if it is filament shaped, it tends to carry yellow. In other words, this special property of the configuration of the development silver can be taken into consideration in doing the adjustment.

Phthalazinon and phthalazine and the phtalic acids and phtalic anhydrides are generally used as the toning agent of the prior art. Suitable examples of the toning agent include those disclosed in RD17029, U.S. Pat. Nos. 4,123,282, 3,994,732, 3,846,136, and No. 4,021,249.

Aside from these toning agents, couplers described in Japanese Patent Application Laid-Open No. 11-288057 and EP1134611A2 and the like, as well as the leuco dyes described in detail below can be favorably used to adjust the tone.

Color changes upon storage of the image is remarkably prevented by also using silver halide grains which convert to internal latent image after the thermal development of this invention.

[Leuco Dyes]

Leuco dyes are preferably used in the dry imaging silver salt photothermographic material of this invention.

The leuco dye that is used favorably used is any colorless or slightly colored compound which is oxidized to a colored form when heated at 80-200° C. for 0.5-30 seconds or any leuco compound which forms a dye by being oxidized by silver ions. A compound which has pH receptivity and can be oxidized to a colored state is also effective.

The typical leuco dye suitable for use in this invention is not particularly limited, and examples include biphenol leuco dyes, phenol leuco dyes, indoalinine leuco dyes, acrylated azine leuco dyes, phenoxadine leuco dyes, phenodiazine leuco dyes, and phenothiazine leuco dyes. Effective leuco dyes include those disclosed in U.S. Pat. Nos. 3,445,234, 3,846,136, 3,994,732, 4,021,249, 4,021,250, 4,022,617, 4,123,282, 4,368,247, 4,461,681 and Japanese Patent Application Laid-Open No. 50-36110, No. 59-206831, No. 5-204087, No. 11-231460, and No. 2002-169249, and No. 2002-236334.

In order to adjust a prescribed hue, it is preferable that leuco dyes having various colors are be used singly, or various types maybe combined and used. In order to prevent excessive yellowing of the tone due to use of highly active reducing agents in this invention, and to prevent excessive redness of the image at the high concentration portions of 2.0 or more in particular due to the use of the fine grains of silver halide, it is preferable that a leuco dye that develops the cyan color is used, but for fine adjustment of the tone it is preferable that yellow leuco dyes and leuco dyes that develop other cyan colors are also used as well.

It is preferable that the developed color density is suitably adjusted using tone resulting from the developing silver itself. In this invention, development is preferably such that the total of the maximum density of the maximum absorption wavelength of the pixel image formed by the leuco dye is preferably between 0.01 and 0.30, more preferably between 0.02 and 0.20 and particularly preferably between 0.02 and 0.10 in order to adjust the tone to be an image in the favorable tone region.

[Yellow Developing Leuco Dye]

The color image forming agents represented by the general formula (YL) below in particular, in which the degree of light absorption for 360-450 nm is increased by oxidation, are favorably used as the yellow color developing leuco dye of this invention.

[Formula 8]

General formula (YL)

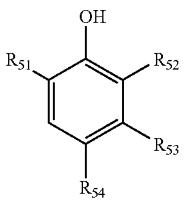

In the formula $R_{51}$ represents an alkyl group, $R_{52}$ represents a hydrogen atom, a substituted or unsubstituted alkyl group or acyl amino group. $R_{53}$ represent a hydrogen atom or substituted or un-substituted alkyl group, and $R_{54}$ represent a group that can be substituted on a benzene ring.

Of the compounds represented by general formula (YL), the compound represented by the general formula (YL') is particularly preferable.

[Formula 9]

General formula (RED)

General Formula (YL')

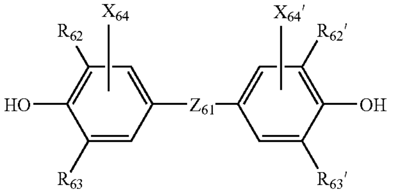

In the formula $Z_{61}$ represents —S— or —$C(R_{61})$ ($R_{61}$'), and $R_{61}$ and $R_{61}$' each represent a hydrogen atom or a substituent group. $R_{62}$, $R_{63}$, $R_{62}$', $R_{63}$' each represents a substituent group.

Example of the compounds (bisphenol compounds) represented by the general formula (YL) include compounds (II-1)-(II-40) described in paragraphs [0032]-[0038] of Japanese Patent Application Laid-Open No. 2002-169249 and compounds (ITS-1)-(ITS-12) described in paragraph [0026] of EP1,211,093. Specific examples of the compounds represented by the general formula (YL) are YL-1-15 described in paragraphs (0396)-(0397) of Japanese Patent Application No. 2003-320555.

The amount of the compound represented by the general formula (YL) to be added is normally in the range of 0.00001-0.01 mol for each mol of silver, preferably 0.0005-0.01 mol and more preferably 0.001-0.008 mol.

(Cyan Developing Leuco Dye)

Next the cyan developing leuco dye will be described. In this invention, a color image forming agent in which the degree of light absorption for 600-700 nm is increased by oxidation is preferably used and these are described in Japanese Patent Application Laid-Open No. 59-206831 (particularly compounds for which λmax is in the region of 600-700 nm), compounds of general formula (I)-general formula (IV) of Japanese Patent Application Laid-Open No. 5-204087 (Specifically compounds (1)-(18) described in paragraphs [0032]-[0037] and the compounds of general formula 4-general formula 7 of Japanese Patent Application Laid-Open No. 11-231460 (Specifically compounds No. 1-No. 79 described in paragraphs [0105].

The cyan developing leuco dyes particularly favorably used in this invention are represented by the general formula (CL) below.

[Formula 10]

General Formula (CL)

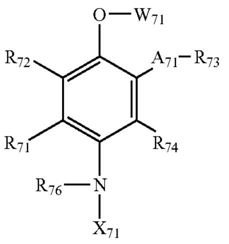

In the formula, $R_{71}$ and $R_{72}$ represent a hydrogen atom, a halogen atom, a substituted or un-substituted alkyl group, alkenyl group, or alkoxy group, NHCO—$R_{79}$ in which $R_{79}$ is an alkyl group, aryl group or which is a heterocyclic group. $R_{71}$ and $R_{72}$ are groups which bond with each other to form aliphatic hydrocarbon rings, aromatic hydrocarbons and or heterocylic rings. $A_{71}$ is a —NHCO— group, a —CONH— group —NHCONH— group, $R_{73}$ is a substituted or un-substituted alkyl group, aryl group or heterocyclic ring. -$A_{71}$-$R_{73}$ is a hydrogen atom, $W_{71}$ is a hydrogen atom or —CONH—$R_{75}$ group, a —CO—$R_{75}$, or a —CO—O—$R_{75}$ group in which, $R_{75}$ is a substituted or un-substituted alkyl group, aryl group, carbamoyl group, and $R_{74}$ represents a hydrogen atom, halogen atom, substituted or unsubstituted alkyl group, alkoxy group, carbamoyl group, or nitryl group. $R_{76}$ is a —CONH—$R_{77}$ group, a —CO—$R_{77}$, or a —CO—O—$R_{77}$ group in which, $R_{77}$ is a substituted or un-substituted alkyl group, aryl group, carbamoyl group. $X_{71}$ represents a substituted or un-substituted aryl group or heterocyclic group.

Specific examples of the cyan developing leuco dye (CL) are CL-1-12 described in paragraphs. (0405)-(0407) of the specification Japanese Patent Application Laid-Open No. 2003-320555.

The amount of the cyan developing leuco dye to be added is normally in the range of 0.00001-0.05 mol for each mol of silver, preferably 0.0005-0.02 mol and more preferably 0.001-0.01 mol.

The method for adding the compound represented by the general formula (YL) and the cyan developing leuco dye may be the same as the method for adding the reducing agent represented by the general formula (RED), and may be included in a coating solution in a suitably selected form such as a solution, emulsion dispersion form, solid fine grains dispersion and the like and then included in the light-sensitive material.

The compound represented by the general formula (YL) and the cyan developing leuco dye is preferably included in an image forming layer containing an organic silver salt, but in addition to the one image forming layer, one compound may be included in the image forming layer while the other compound may be included in the non image forming layer that is adjacent to the image forming layer, or alternatively both compounds may be included in the non image forming layer. In addition, in the case where the image forming layer is formed of multiple layers, each compound may be included in separate layers.

[Coating Aids and Other Agents]

In this invention, it is preferable that a matting agent is included in the surface layer (also in the case where a light-insensitive layer is provided the light-sensitive layer or at the side opposite to the light-sensitive layer between supports) in the silver salt photothermographic dry imaging material in order to facilitate handling prior to development and to prevent damage to the image after thermal development. It is preferable that 0.1-30 percent by weight of the binder amount is included.

The material forming the matting agent may be organic or inorganic. Examples of inorganic compounds which may be used as the matting agent include silica described in Swiss Patent No. 330,158, glass powder described in French Patent No. 1,296,995, carbonates of alkali earth metals, cadmium and zinc described in British Patent No. 1,173,181. Examples of the organic compound include that can be used as the organic matting agent include starch described in U.S. Pat. No. 2,322,037, starch derivatives described in Belgian Patent No. 625,451 and British Patent No. 981,198, polyvinyl alcohols described in Japanese Patent Publication No. 44-3643, polystyrenes or polymetacrylates described in Swiss Patent No. 330,158, polyacrylonitryles described in U.S. Pat. No. 3,079,257, and polycarbonates described in U.S. Pat. No. 3,022,169.

The average grain diameter of the matting agent is preferably 0.5-10 μm, more preferably 1.0-8.0 μm. In addition the variation coefficient of the grain size distribution is preferably 50% or less, more preferably 40% or less, and 30% or less is particularly preferable.

The variation coefficient of the grain size distribution herein, refers to the value represented by the formula below.

(Standard deviation of grain diameter)/(Average value of grain diameter)×100

The method for adding the matting agent of this invention may be a method in which it is dispersed in a coating solution in advance and then performing coating, or a method in which after the coating solution is coated, the matting agent is sprayed on before drying is complete. In the case where multiple matting agents are used, both methods may be used together.

[Fluorine-Based Surfactant]

The fluorine-based surfactants represented by the general formulas (SA-1)-(SA-3) below are preferably used in the imaging material of this invention.

$(Rf\text{-}L_{81})_{p81}\text{-}Y_{81}\text{-}(A_{81})_{q81}$ General Formula (SA-1)

$(LiO_3S—(CF_2)_{n81}—SO_3Li$ General Formula (SA-2)

$M_{81}O_3S—(CF_2)_n—SO_3M_{81}$ General Formula (SA-3)

In the formula, $M_{81}$ represents a hydrogen atom, a sodium atom, a potassium atom, or an ammonium group, n represents a positive integer, but when $M_{81}$ is H, n81=1-6 and 8; when $M_{81}$ is Na, n81=4; when $M_{81}$ is K, n81=1-6; and when $M_{81}$ is an ammonium group, n81=1-8.

In general formula (SA-1), Rf represents a substituent group containing a fluorine atom, and examples of the substituent group containing a fluorine atom include alkyl groups containing 1-25 carbons (such as a methyl group, an ethyl group, a butyl group, an octyl group, a dodecyl group, an octadecyl group and the like), or an alkenyl group (such as a propenyl group, a butenyl group, nonenyl group, and a dodecenyl group).

$L_{81}$ represents a divalent linking group that does not contain a fluorine atom and examples include an alkylene group (such as methylene, ethylene, butylene groups and the like), an alkyleneoxy group (such as a methyleneoxy group, an ethyleneoxy group, and a butyleneoxy group), an oxyalkylene group (such as an oxymethylene group, an oxyethylene group, an oxybutylene group and the like), an oxyalkeleneoxy group (such as an oxymethyleneoxy group, an oxyethyleneoxy group, an oxyethyleneoxy, an ethyleneoxy group and the like), a phenylene group, an oxyphenylene group, a phenyloxy group, an oxyphenyloxy group or a group in which these groups are combined.

$A_{81}$ represents an anion group or a salt group thereof (such as a carbonate group or salts thereof (such as sodium salt, potassium salt, and lithium salt), sulfon groups or salts thereof (such as sodium salt, potassium salt, and lithium salt), and phosphate groups or salts thereof (such as sodium salt, potassium salt, and lithium salt).

$Y_{81}$ represents a trivalent or tetravalent linking group which does not contain fluorine atom, but an atom group comprising a trivalent or tetravalent linking group which does not have a fluorine atom and has a carbon atom of nitrogen atom at the center thereof may be used. p81 represents an integer of 1-3, and q81 represents and integer of 2-3.

The fluorine-based surfactant represented by the general formula (SA-1) can be obtained from alkyl compounds having 1-25 carbon atoms into which fluorine atoms are introduced (such as compounds containing a trifluoromethyl group, a pentafluoromethyl group, a perfluorobuthyl group, a perfluorooctyl group, and a perfluorooctadecyl group), and alkenyl compounds (such as perfluorohexenyl and perfluorononenyl groups) and alkanol compounds with a valency of 3-6 into which fluorine atoms have not been introduced, or compound obtained by addition reaction or condensation reaction with heterocyclic compounds or aromatic compounds containing 3-4 hydroxide groups (an alkanol compound with Rf as one portion), as well as those obtained by introducing an anion group ($A_{81}$) due to sulfate esterification.

Examples of the alkanol compounds having a valency of 3-6 include glycerin, pentaerythritol, 2-methyl-2-hydroxymethyl 1,3-propanediol, 2,4 dihydroxy-3-hydroxymethylpentene, 1,2,6-hexanetriole, 1,1,1-tris(hydroxymethyl) propane, 2,2-bis(butanol)-3, aliphatic triole, tetramethylol methane, D-sorbitol, xylitol, D-mannitol and the like.

In addition, examples of the aromatic compound and the heterocyclic compound having 3-4 hydroxide groups include 1,3,5-trihydroxybenzene and 2,4,6-trihydroxypyridine.

The fluorine-based surfactant represented by the general formulas (SA-1)-(SA-3) can be added to the coating solution using any known method for addition. That is to say, the fluorine-based surfactant may be dissolved in polar solvents like alcohols such as methanol, ethanol and the like, ketones such as methylethyl ketone, dimethylsulfoxide, and dimethylformamide and the like. In addition, the surfactant can be made into fine grains of 1 μm or less using sand mill dispersion, jet mill dispersion, supersonic wave dispersion, or homogenizer dispersion and added to water or an organic solvent. Many techniques for fine grains dispersion have been disclosed and dispersion may be done based on these techniques. It is preferable the surfactant is added to the protective layer which is the outermost layer.

The amount of the fluorine-based surfactant that is added is preferably in the range $1\times10^{-8}$-$1\times10^{-1}$ mol per 1 $m^2$ and is particularly preferable $1\times10^{-5}$-$1\times10^{-2}$. If the amount is less than the former range, antistatic properties cannot be obtained, while if the amount exceeds the former range, humidity dependency is large and storage capacity in high humidity deteriorates.

It is to be noted that the surfactants represented by each of the general formula (SA-1), general formula (SA-2), and general formula (SA-3) are described in Japanese Patent Application Laid-Open No. 2003-57786, Japanese Patent Application No. 2002-178386 and Japanese Patent Application No. 2002-237982.

The material of the support used for the silver salt photothermographic dry imaging material of this invention may be any type of polymer material, glass, wool cloth, cotton cloth, paper, metal (such as aluminum and the like), but any flexible material which can be handled as an information recording material and can be wound into a sheet or a roll is suitable. Thus the support of the dry imaging silver salt photothermographic material of this invention is preferably a plastic film (such as a cellulose acetate film, a polyester film, a polyethylene terephthalate film, a polyethylene naphthalate film, a polyamide film, a polyimide film, a cellulose triacetate film, or a polycarbonate film). A polyethylene terephthalate film that has been biaxially stretched is particularly favorable in this invention. The thickness of the support is usually 50-300 μm and preferably 70-180 μm.

In order to improve antistatic properties in this invention, an electrically conductive compound such as a metal oxide compound and/or an electrically conductive polymer may be included in the composing layers. These electrically conductive compounds may be included in any layer, but is preferably included in the undercoat layer, the backing layer, or the layer between the light-sensitive layer and the undercoat layer. The electrically conductive compounds described in columns 14-20 of U.S. Pat. No. 5,244,773 are preferably used in this invention.

The dry imaging silver salt photothermographic material of this invention has at least one light-sensitive layer on a support. The light sensitive layer only may be formed on the support, but it is preferable that at least one light-insensitive layer is formed on the light-sensitive layer. For example it is preferable that a protective layer is provided is formed on the light-sensitive layer in order to protect the light sensitive layer and that a backing coat layer is provided at the surface opposite to the support in order to prevent adhesion between the light sensitive materials, or in adhesion in a roll of the light sensitive material. The binder used in the protective layer and backing coat layer is selected from polymers whose glass transition point is higher than the thermally developing image layer, and for which abrasion, defects, and deformation is unlikely, and examples which include cellulose acetate, cellulose acetate butylate and the like can be selected from the above binders. It is to be noted that in this invention, it is preferable that there are 2 or more light-sensitive layers for the purpose gradient adjustment and the like. For example, 2 light-sensitive layers may be provided on one side of the support, or one light sensitive layer may be provide on both sides of the support.

In the dry imaging silver salt photothermographic material of this invention, it is preferable that a filter layer is formed on the same side or on the opposite side of the light-sensitive layer in order to control the amount or wavelength distribution of light transmitted through the light-sensitive layer, or that a dye or pigment is included in the light-sensitive layer.

The dye used can be a compound which absorbs light of various wavelength regions in accordance with the color sensitivity of the light-sensitive region.

In the case where the dry imaging silver salt photothermographic material of this invention is an image recording material using infrared light, squarylium dyes having a thiopyrylium nucleus which are disclosed in Japanese Patent Application Laid-Open No. 11-255557 (called thiopyrylium squarylium dye in this specification) and squarylium dyes having a pyrylium nuclei (called pyrylium squarylium dyes in this specification) are favorably used. Aside from squarilium dyes, thiopyryliumcroconium dyes or pyryliumcroconium dyes are also favorably used.

It is to be noted that compounds having a squarylium nucleus are compounds having 1-cyclobutene-2-hydroxy-4-on in its molecular structure, and a compound containing a croconium nucleus refers to a compound having 1-cyclopentene-2-hydroxy-4,5-dion in its molecular structure. The hydroxyl group herein may be dissociated. In this specification, all these dyes are called squarylium dyes hereinafter for the sake of convenience.

It is to be noted that the compounds of Japanese Patent Application Laid-Open No. 8-201959 are also favorable as dyes.

[Layer Composition and Coating Conditions, etc.]

It is preferable that the material for each of the layers composing the dry imaging silver salt photothermographic material of this invention are formed by dissolving or dispersing in solvents to form coating solutions and simultaneous multiple layer coating is performed and then heat processing is carried out. "Simultaneous multiple layer coating" herein means that the coating solution for each of the layers composing the material (such as the light-sensitive layer and protective layer) is prepared, and when these are coated on the support, the processes of coating is not such that they are individually coated and dried and then these operations are repeated for each layer, but rather each layer composing the material is formed such that layer coating is performed simultaneously and the drying steps are also performed simultaneously.

The method is not particularly limited to simultaneous multiple layer coating for coating the composing layers, and known methods such as the bar coater method, the curtain coating method, the dipping method, the air knife method, the hopper coating method, the extrusion coating method and the like may be used. Of these methods, the most preferable is the pre-weighing type coating system which is called an extrusion coating method. As in the case of the slide coating method, in the extrusion coating method, there is no volatilization on the slide surface and thus this is suitable for accurate coating and organic solvent coating. The coating method has been described for the side having the light-sensitive layer, but the method is the same for undercoating and the backing coat layer.

In this invention, the coating amount is preferably between 0.5 $g/m^2$ and 2.0 $g/m^2$, and more preferably between 1.0 $g/m^2$ and 1.5 $g/m^2$.

Also in this invention, the amount of silver conversion included in the silver halide emulsion for silver halide grains having a grain diameter between 0.030 μm and 0.055 μm is preferably between 3% and 15% for the range between 0.5 $g/m^2$ and 1.5 $g/m^2$.

It is preferable that the amount of silver from the silver halide is 2-18% of the total amount of silver in the silver coating layer, and more preferably 3-15%.

The coating density of the silver halide grains having a grain diameter of 0.01 μm or less (a sphere equivalent grain diameter) is preferably between $1\times10^{14}$ grains/$m^2$ and $1\times10^{18}$ grains/$m^2$, and more preferably $1\times10^{15}$ grains/$m^2$ and $1\times10^{17}$ grains/$m^2$.

Further, the coating density of the aliphatic carboxylic acid silver salt of this invention is preferably between $10^{-17}$ g and $10^{-15}$ g, and more preferably between $10^{-16}$ g and $10^{-14}$ g.

When coating is carried out under conditions within said range, from the viewpoint of maximum optical silver image density per definite silver coverage, or in other words, covering power as well as silver image tone, desired results are obtained.

[Exposure Conditions]

It is desirable that a suitable light source is used for the color sensitivity provided to the light-sensitive material in the dry imaging silver salt photothermographic material of this invention. For example, in the case where the light-sensitive material is sensitive to infrared light, any light source may be suitably used for the infrared light region, but an infrared semiconductor laser (780 nm, 820 nm) is more preferably used in view of the fact that the laser is high power laser and in order to make the light-sensitive material transparent.

In this invention, exposure is preferably performed by laser scanning exposure, but various methods may be adopted as the exposure method. For example, the first preferable method is a method using a laser scanning exposure device the angle between the scanning surface of a light-sensitive material and the scanning laser beam does not become substantially orthogonal.

The expression "does not become substantially orthogonal" means that the angle that is closest to orthogonal during laser scanning is preferably between 55 degrees and 88 degrees, and more preferably between 60 degrees and 86 degrees, still more preferably between 65 degrees and 84 and far more preferably between 70 degrees and 82 degrees.

The beam spot diameter of the laser beam at the light-sensitive material exposure surface when the light-sensitive material is being scanned is preferably 200 μm or less, and more preferably 100 μm or less. This is favorable in that with a smaller spot diameter, the angle of offset from the orthogonal angle of incidence of the laser is reduced. It is to be noted that the lower limit for the beam spot diameter is 10 μm. By performing this kind of laser scanning, image quality deterioration due to the reflected light such as occurrence of unevenness which is similar to interference fringe and the like can be reduced.

A second preferable method is one in which the exposure is performed using a laser detection exposure device which emits scanning laser beam in a longitudinal multiple scanning. Compared to the single mode scanning laser beam, the occurrence of unevenness which is similar to an interference fringe that cause image quality deterioration, is reduced.

In the longitudinal multiple scanning, a method which uses the return beam or which is from high frequency wave superposition is favorable. It is to be noted that longitudinal multiple scanning means that there is more than one exposure wavelength, and the exposure wavelength distribution is commonly 5 nm or more and more preferably 10 nm or more. The upper limit of the exposure wavelength distribution is not particularly limited, but is usually about 60 nm.

It is to be noted that in the first and second aspects of the image recording method, the laser used for the scanning exposure are generally well known and may be suitably selected according to application from lasers such as ruby laser, YAG laser, and glass laser; gas lasers such as HeNe laser, Ar ion laser, Kr ion laser, $CO_2$ laser, CO laser, HeCd laser, $N_2$ laser, excimer laser and the like; semiconductor laser such as InGaP laser, AlGaAs laser, GaAsP laser, InGaAs laser, InAsP laser, $CdSnP_2$ laser, GaSb laser and the like; chemical lasers, and dye lasers. However, of these, semiconductor lasers having a wavelength of 600-1200 nm are preferably used in view of the problems of maintenance and the size of the light source. It is to be noted that in the laser used in the laser imager or the laser image setter, the beam spot diameter at the material exposure surface when the laser is scanned on the dry imaging silver salt photothermographic material generally has a short axis diameter in the range of 5-75 μm and a long axis diameter in the range of 5-100 μm. Further, it is possible to set a laser beam scanning rate at the optimal value for each light-sensitive material depending on the inherent sensitivity of the silver salt photothermographic dry imaging material at laser transmitting wavelength and the laser power.

[Development Conditions]

In this invention, the development conditions vary depending on the device, apparatus or means used. Typically, development involves heating of the dry imaging silver salt photothermographic material which has been exposed image wise at optimal high temperatures. It is possible to develop a latent image formed by exposure by heating said material at a middle range temperature (for example 100-200° C.) for a sufficient time (generally 1 second to 2 minutes). If the heating temperature is less than 100° C., sufficient image density is not obtained in a short time, while if the temperature exceeds 200° C., the binder dissolves and this has an adverse effect not only on the image itself in terms of transfer onto the roller, but also on conveyance properties and the development device and the like. By performing heating, silver images are created by the oxidizing and reducing reaction between the silver ions (which function as an oxidizing agent) that are supplied from the aliphatic carboxylic acid silver salt and the reducing agent. This reaction proceeds with supplying any processing solutions such as water from the outside.

EXAMPLE

The following is a detailed description of the invention using embodiment, but the invention is not limited to this embodiment.

Embodiment 1

<Preparing Photograph Support That Has Been Subjected to Under Coat Processing>

A photograph support which was subjected to Corona discharge processing at 8 W·minute/$m^2$ on both surface of a polyethylene terephthalate film with a thickness of 175 μm which had been subjected to blue color fixing to have an optical density of 0.170 (measured by densitometer PDA-65 manufactured by Konica) and which had been heat-fixed to perform biaxial stretching was subjected to heat processing. In other words, one surface of the photograph support was coated with undercoat coating solution a-1 at 22° C. and 100 m/minute so as to have a dry thickness of 0.2 μm, and then dried at 140° C. to form the image formation layer side under coat layer (called undercoat lower layer A-1). Also, the below undercoat coating solution b-1 is formed as the backing layer undercoat layer at the opposite side surface at 22° C. and 100 m/minute so as to have a dry thickness of 0.12 μm, and then dried at 140° C. and an undercoat electrically conductive layer (called undercoat lower layer B-1) having an antistatic function is formed at the backing layer side. The upper surface of the undercoat lower layer A-1 and the undercoat lower layer B-1 are subjected to Corona discharging at 8 W·minute/$m^2$, and the undercoat coating solution a-2 which is below, is coated on the undercoat layer A-1 at 33° C. and 100 m/minute so as to have a dry thickness of 0.03 μm, and then dried at 140° C. and an undercoat layer A-2 is formed. The undercoat coating solution b-2 which is below, is coated on the undercoat lower layer B-1 at 33° C. and 100 m/minute so as to have a dry thickness of 0.2 μm, and then the support is subjected to heat treatment for 2 minutes at 123° C. and then wound under conditions of 25° C. and 50% RH to form an undercoated sample.

[Preparation of a Solution of Aqueous Polyester A-1]

35.4 parts by weight of dimethyl terephthalate, 33.63 parts by weight of dimethyl isophthalate, 17.92 parts by weight of 5-sulfoisophthalate dimethyl sodium salts, 62 parts by weight of ethylene glycol, 0.065 parts by weight of calcium acetate monohydrate salt, and 0.022 parts by weight of manganium acetate tetrahydrate salt are subjected to an ester exchange reaction while distilling methanol in a nitrogen air stream at 170° C.-220° C., and then 0.04 parts by weight of trimethyl phosphate, 0.04 parts by weight of antimony trioxide as the polycondensation catalyst and 6.8 parts by weight of 1,4-cyclohexane dicarbonate are added, and then a reasonable amount of water is distilled at a reaction temperature of 220-235° C. to perform an esterification reaction.

Subsequently, the pressure inside the reaction system is reduced over approximately 1 hour, and the temperature is increased and polycondensation is carried out for 1 hour at a final temperature of 280° C. and 133 Pa or less to synthesize the aqueous polyester A-1. The intrinsic viscosity of the aqueous polyester A-1 obtained is 0.33, the average particular diameter is 40 nm, and the molecular weight is 80,000-100,000.

Next, 850 ml of pure water is poured into a 2 L flask with 3 openings that is equipped with an stirring blade, circulation cooling pipes, and a thermometer, and 150 g of aqueous polyester A-1 is gradually added while rotating the stirring blade. The resultant is stirred in this state for 30 minutes and then heated for to a temperature of 98° C. over 1.5 hours, and then thermal dissolution is performed at this temperature for 3 hours. After heating is complete, the resultant solution is cooled to room temperature over a period of 1 hour and then left overnight and a 15 percent by weight solution of aqueous polyester A-1 was thereby prepared.

[Preparation of Denatured Aqueous Polyester B-1 to B-2 Solution]

1900 ml of the 15 percent by weight aqueous polyester A-1 solution from above is poured into a 3 L flask with 4 openings that is equipped with an stirring blade, circulation cooling pipes, a thermometer and a dropping load, and the flask is heat to 80° C. while rotating the stirring blade. A 24% aqueous solution of 6.52 ml of ammonium peroxide is added and a monomer mixture (28.5 g glycidyl methacrylate, 21.4 g ethyl acrylate, and 21.4 g methyl metacrylate) is dropped in over 30 minutes and the reaction continues for a further 3 hours. Subsequently cooling and filtration are performed and denatured aqueous polyester B-1 solution vinyl-based component denaturing ratio 20 percent by weight) having (a solid portion content of 18 weight percent is thereby prepared.

Except that the vinyl denaturing ratio is 36 percent by weight and the denaturing components are styrene : glycidyl methacrylate : acetoacetoxyethyl metacrylate : n-butyl acrylate in a ratio 39.5 : 40: 20 : 0.5, a denatured aqueous polyester B-2 solution (vinyl-base component denaturing ratio 20 percent by weight) having a solid content of 18 weight percent is prepared in the same manner as above.

[Preparation of Acrylic Polymer Latex C-1 to C3]

Acrylic Polymer Latex C1 to C3 having the monomer composition shown in the table below are synthesized by emulsification polymerization. The solid content for all the latexes is 30 percent by weight.

TABLE 2

| Latex Number | Monomer Composition (weight ratio) | Tg (° C.) |
|---|---|---|
| C-1 | Styrene:glycidyl metacrylate:n-butyl acrylate = 20:40:40 | 20 |
| C-2 | Styrene:n-butyl acrylate:t-butyl acrylate:hydroxyethyl metacrylate = 27:10:35:28 | 55 |
| C-3 | Styrene:glycidyl metacrylate:acetoacetoxyethyl metacrylate 40:40:20 | 50 |

| [Coating solution a-1 for image formation side undercoat lower layer] | |
|---|---|
| Acrylic polymer latex C-3 (solid content 30%) | 70.0 g |
| Aqueous dispersion of ethoxy alcohol and ethylene homopolymer (solid content 10%) | 5.0 g |
| Surfactant (A) | 0.1 g |

Distilled water was added to the above components and made up to 1000 ml to form the coating solution.

| <Coating solution a-2 for image formation side undercoat upper layer> | |
|---|---|
| Denatured aqueous polyester B-2 solution (18 percent by weight) | 30.0 g |
| Surfactant (A) | 0.1 g |
| Spherical silica matting agent (Seahoster-KE-P50 (manufactured by Nippon Catalysts, Ltd. | 0.04 g |

Distilled water was added to the above components and made up to 1000 ml to form the coating solution.

| [Coating solution b-1 for backing side undercoat lower layer] | |
|---|---|
| Acrylic polymer latex C-1 (solid content 30%) | 30.0 g |
| Acrylic polymer latex C-2 (solid content 30%) | 7.6 g |
| $SnO_2$ sol | 180 g |
| ($SnO_2$ sol which is synthesized using the method described in embodiment 1 of Japanese Patent Application Laid-Open No. 35-6616 is heat-condensed to have a solid content of 10 weight percent and then prepared to have a pH of 10 in ammonia water.) | |
| Surfactant (A) | 0.5 g |
| 5 percent by weight water siluble solution of PVA-613 (PVA manufactured by Kraray) | 0.4 g |

Distilled water was added to the above components and made up to 1000 ml to form the coating solution.

| [Coating solution b-2 for backing side undercoat upper layer] | |
|---|---|
| Denatured aqueous polyester B-1 (18 percent by weight) | 145.0 g |
| Spherical silica matting agent (Seahoster-KE-P50 (manufactured by Nippon Catalyst, Ltd.) | 0.2 g |
| Surfactant (A) | 0.1 g |

Distilled water was added to the above components and made up to 1000 ml to form the coating solution.

It is to be noted that an antihalation layer having the composition below is coated onto the undercoat layer A-2 of the support that has the aforementioned undercoat layer.

| (Antihalation layer coat composition) | |
|---|---|
| PVB-1 (bonding agent) | 0.8 $g/m^2$ |
| C1 (dye) | $1.2 \times 10^{-5}$ $mol/m^2$ |

On the back surface side, a BC layer that has been prepared so as to have the amounts below (per 1 $m^2$) and each of the coating solutions for the protective layer thereof are sequentially coated on the undercoat upper layer B-2 and dried to form the BC layer and the protective layer.

| | |
|---|---|
| (BC Layer Composition) | |
| PVB-1 (bonding agent) | 1.8 g |
| Cl (dye) | $1.2 \times 10^{-5}$ $mol/m^2$ |
| (BC Layer Protective Layer Coating Solution) | |
| Cellulose acetate butylate | 1.1 g |
| Matting agent (polymethyl metacrylate: Average grain diameter 5 μm) | 0.12 g |

-continued

| | |
|---|---|
| Antistatic agent: F-EO | 250 mg |
| Antistatic agent F-DS1 | 30 mg |

[Formula 11]

Surfactant (A)

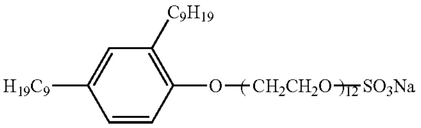

Cl (Dye)

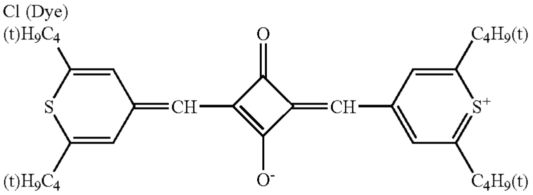

F-EO

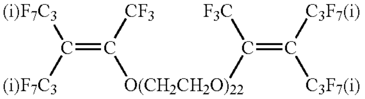

F-DS1

$LiO_3S—(CF_2)_3—SO_3Li$

| <Preparation of light-sensitive silver halide emulsion> | |
|---|---|
| (Solution A1) | |
| Phenyl carbamoyl gelatin | 88.3 g |
| Compound A (*1) (10% water soluble solution of methanol) | 10 ml |
| Potassium bromide | 0.32 g |
| Make up to 5429 ml with water. | |
| (Solution B1) | |
| 0.67 mol/L aqueous solution of silver nitrate | 2635 ml |
| (Solution C1) | |
| Potassium bromide | 51.55 g |
| Potassium iodide | 1.47 g |
| Make up to 660 ml with water | |
| (Solution D1) | |
| Potassium bromide | 154.9 g |
| Potassium iodide | 4.41 g |
| $K_3IrCl_6$ (equivalent to $4 \times 10^{-5}$ mol/Ag) | 50.0 ml |
| Make up to 1982 ml with water. | |
| (Solution E1) | |
| 0.4 mol/L water-soluble solution of potassium bromide | Amount controlled by the silver potential below |
| (Solution F1) | |
| Potassium hydroxide | 0.71 g |
| Make up to 20 ml with water. | |
| (Solution G1) | |
| 56% aqueous solution of acetic acid | 18.0 ml |
| (Solution H1) | |
| Anhydrous sodium carbonate | 1.72 g |
| Make up to 151 ml with water. | |

(*1) Compound A: $HO(CH_2CH_2O)_n(CH(CH_3)CH_2O)_{17}(CH_2CH_2O)_mH$ (m + n = 5-7)

A ¼ of the amount of Solution B1 and all of Solution C1 was added to Solution A1 by the double-jet mixing method over 4 minutes and 45 seconds while controlling the temperature to 32° C. and pAg to 8.09 using the mixing agitator described in Japanese Patent Publication No. 58-58288 to perform nuclei formation. Subsequently, 4 ml of a 0.1% ethanol solution of the compound below (ETTU) is added. During this time, pAg adjustment is appropriately performed using the solution E1. After 6 minutes elapsed, ¾ of the amount of Solution B1 and all of Solution D1 was added by the double-jet mixing method over 14 minutes and 15 seconds while controlling the temperature to 32° C. and pAg to 8.09. After stirring for 5 minutes, the temperature was increased to 40° C., and all of Solution G1 was added to precipitate the silver halide emulsion. 2000 ml of the precipitate was kept. After the supernatant fluid was removed, 10 l of water was added and stirred, and the silver halide emulsion was precipitated once again. 1500 ml of the precipitate was kept and after the supernatant fluid was removed, another 10 l of water was added and stirred and the silver halide emulsion was precipitated. Solution H1 was added and the temperature was increased to 60° C. and then stirring is done for 120 minutes. Finally the pH is adjusted to 5.8 and water is added such there is 1161 g per mole of silver, and the light-sensitive emulsion dispersion A is thereby obtained.

The average grain size of this emulsion is 0.042 μm and the variation coefficient of the grain size is 10%, and the grains are cubic iodized silver grains with 94% having a [100] surface ratio.

<Preparation of the Light-Sensitive Layer Coating Solution>

(Preparation of Powdered Aliphatic Carboxylic Acid Silver Salt A)

117.7 g of behenic acid, 60.9 g of arachidic acid, 39.2 g of stearic acid, 2.1 g of palmitinic acid were dissolved in 4720 ml of pure water at 80° C. Next 486.2 ml of 1.5 mol/L aqueous solution of potassium was added to water, and after 6.2 ml of concentrated nitric acid was added, the resultant solution is cooled to 55° C. to thereby obtain aliphatic acid potassium solution. The temperature of the aliphatic acid potassium solution was kept at 55° C. and 347 ml of t-butyl alcohol was added, and after stirring for 20 minutes, 45.3 g of the above light-sensitive silver halide emulsion 1 and 450 ml of pure water was added, and then stirring was done for 5 minutes.

Next, 702.6 g of a 1 mol/L of silver nitrate is added to water over a 2 minute period, and then stirring was done for 10 minutes to obtain an aliphatic carboxylic acid silver salt dispersion. Subsequently, the aliphatic carboxylic acid silver salt dispersion obtained was transferred to a water bath and after deionized water was added and stirring done, the resultant was left to stand still and the dispersed aliphatic carboxylic acid silver salt was allowed to float and was separated, and the lower portion, containing water-soluble salts, were removed. Thereafter, washing was repeated using deionized water until electric conductivity of the resultant effluent reached 50 μS/cm. After centrifugal dehydration, the resultant cake-shaped aliphatic carboxylic acid silver salt was dried using gas flow type dryer Flush Jet Dryer (manufactured by Seishin Kigyo Co., Ltd.), while setting the drying conditions such as nitrogen gas as well as heating flow temperature at the inlet of said dryer, until its water content ratio reached 0.1 percent, and powder aliphatic carboxylic acid silver salt A was thereby prepared. The water content ratio of aliphatic carboxylic acid silver salt compositions was determined by employing an infrared moisture meter. It is then confirmed that the silver proportion of the aliphatic silver carbonate is approximately 95% using the above-described method.

(Preparation of Preliminary Dispersion A)

14.57 g of polyvinyl butyral resin were dissolved in 1457 g of methylethyl ketone (MEK hereinafter) and 500 g of the powdered aliphatic carboxylic acid silver salt A from above were gradually added while stirring in a dissolver DISPERMAT CA-40M manufactured by VMA-GETZMANN, and the preliminary dispersion A was prepared by sufficient mixing.

(Preparation of the Light-Sensitive Dispersion A)

The preliminary dispersion A prepared above was charged to a media disperser, DISPERMAT SL-C12EX model (manufactured by VMA-GETZMANN) which was filled to 80% of the internal capacity with zirconia beads (Torayceram manufactured by Toray) having a diameter of 0.5 mm such that the retention time inside the mill was 1.5 minutes, using a pump, and by performing dispersion with a mill circumferential speed of 8 m/s, the light-sensitive emulsion dispersion A was thereby prepared.

(Preparation of Stabilizing Agent)

1.0 g of stabilizing agent 1 and 0.31 g of potassium acetate were dissolved in 4.97 g of methanol to thereby prepare the stabilizing agent.

(Preparation of Infrared Sensitizing Dye)

19.2 mg of infrared-sensitizing dye 1, 10 mg of infrared-sensitizing dye 2, 1.48 g of 2-chloro-benzoic acid, 2.78 g of stabilizer 2 and 365 mg of 5-methyl-2-mercaptobenzimadazole were dissolved in 31.3 ml of MEK in a dark place and the infrared-sensitizing dye A was thereby prepared.

(Preparation of Additive a)

14.0 g of each of the compounds RED-1 and RED-2 which are the developing agents, 1.54 g of 4-methylfumaric acid, and 0.20 g of the dye C1 are dissolved in 110 g of MEK and 75 mg of each of the compound YL-1 and CL-1 leuco dye was added as the leuco dye to thereby form additive a.

(Preparation of Additive b)

3.56 g of the fogging agent 2, and 3.43 g of phtalazine ate dissolved in 40.9 g of MEK to form the additive b.

(Preparation of the Light-Sensitive Layer Coating Solution A)

In an inert gas environment (nitrogen 97%), the temperature was maintained at 21° C. while, the light-sensitive emulsion dispersion A (50 g) and 15.11 g of MEK were stirred and 390 μl of the fogging agent 1 (10% methanol solution) was added and then stirred for 1 hour. Next, 240 ml of sulfur sensitizer S-5 (0.5% methanol solution) was added and then stirring was done for 1 hour at 21° C. to perform chemical sensitization. Next 494 μl of calcium bromide (10% methanol solution) was added and stirring was done for 20 minutes. Next 167 ml of the stabilizing agent solution was added and after stirring for 10 minutes, 1.32 g of the infrared sensitizing dye solution A was added and stirring was done for 1 hour. Subsequently, the temperature was lowered to 13° C. and stirring for a further 30 minutes was done. The temperature was maintained at 13° C. and 13.31 g of the polyvinyl acetal resin P-1 was added as the binder resin, and after stirring was done for 30 minutes, 1.084 g of tetrachlorophthalic acid (9.4 percent by weight MEK solution) was added and dispersion done for 30 minutes. Then 12.43 g of additive a, 1.6 ml of Desmodur N3300/aliphatic isocyanate manufactured by Mobay (10% MEK solution) and 4.27 g of additive solution b were sequentially added while continuing to stir and the light-sensitive layer coating solution A was thereby formed.

[Formula 12]
Stabilizing agent 1
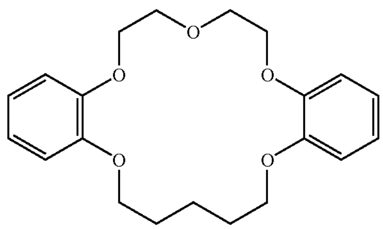
Sulfur sensitizer S-5
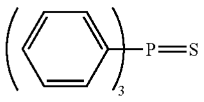
Antifogging agent 1
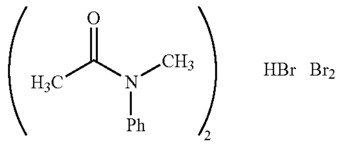
ETTU
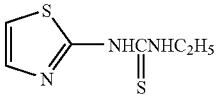
Stabilizing agent 2
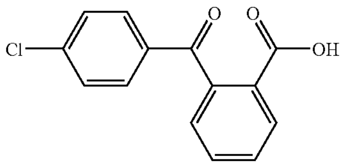
Antifogging agent 2
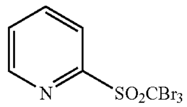
Infrared sensitizer 1
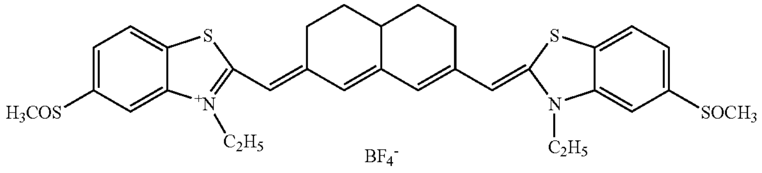
Infrared sensitizer 2
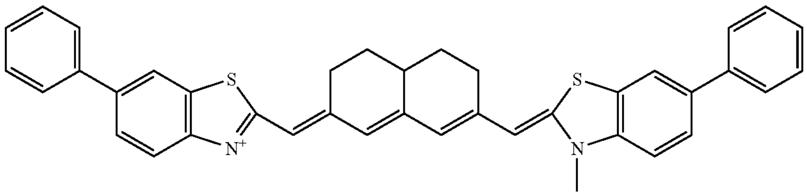
[Formula 13]
(RED-1)
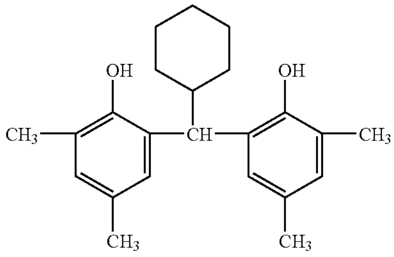
(RED-2)
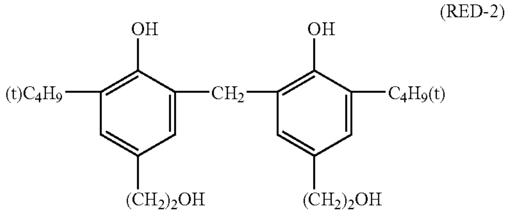

-continued (YL-1)

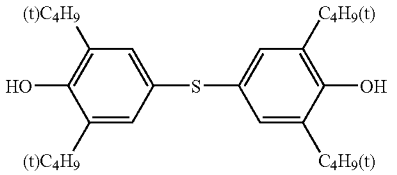

(CL-1)

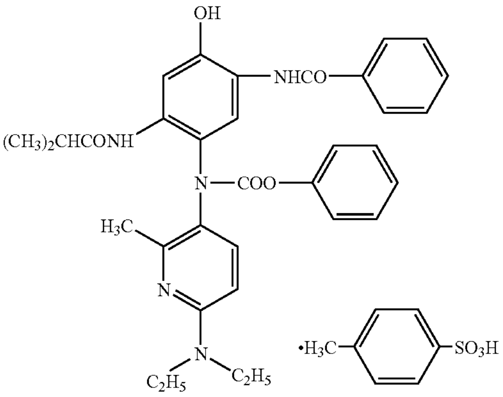

<Surface Protection Layer>

A coating solution having the composition below was prepared in the same manner as the light-sensitive layer coating solution and then coated on the light-sensitive layer so as to have the quantities described below (per 1 $m^2$) and dried, to thereby form the light-sensitive surface protective layer.

| | |
|---|---|
| Cellulose acetate propionate | 2.0 g |
| 4-methyl phthalate | 0.7 g |
| Tetrachlorophthalic acid | 0.2 g |
| Tetrachlorophthalic acid anhydride | 0.5 g |
| Silica matting agent (average grain diameter 5 μm) | 0.5 g |
| 1,3-bis (vinyl sulfonyl)-2-propanole | 50 mg |
| Benzotriazole | 30 mg |
| Antistatic agent: F-EO | 20 mg |
| Antistatic agent: F-DS1 | 3 mg |

It is to be noted that polyacetal is used as the coupling agent and methylethyl ketone (MEK) is used as the organic solvent. Polyacetal does 98% saponification of polyvinyl acetate having a degree of polymerization of 500 and 86% of the remaining hydroxyl group is combined with butyral and called PVB1.

<Preparation of the Photothermographic Dry Imaging Material 1>

The light-sensitive layer coating solution and the surface protection layer coating solution from above are simultaneously coated in layers on the undercoat layer of the support formed above using a known extrusion coater. The coating is performed such that the light-sensitive layer has a silver coating amount of 1.5 g/$m^2$ and the dry thickness of the surface protection layer is 2.5 μm. Subsequently, drying is done for 10 minutes using a drying temperature of 75° C. and a dew point temperature of 10° C., and the dry imaging material 1 for photothermographic is thereby produced.

<Production of the Photothermographic Dry Imaging Material 2>

"Photothermographic dry imaging material with substantially no post-development light sensitivity" that is described in Japanese Patent Application Laid-Open No. 2004-4522 is produced as the photothermographic dry imaging material 2 (film 2).

<Production of the Photothermographic Dry Imaging Material 3>

The photothermographic dry imaging material 3 (film 3) was. produced in the same manner as in the production of the sample 1 (preparation of the powdered aliphatic carboxylic acid silver salt A) except that instead of 117.7 g of behenic acid, 60.9 g of arachidic acid, 39.2 g of stearic acid, and 2.1 g of palmitinic acid, 219.9 g of behenic acid was used.

<Evaluation of the Values>

The photothermographic dry imaging material 1, 2 and 3 (films 1, 2 and 3) were set in the film holding portion if the laser imager shown in FIG. 1 and conveyed by the film guide 10. (The conveyance rollers 2 are set all the way to the exit 7, but only a portion is shown in the drawing.) The photothermographic dry imaging material 1, 2 and 3 (films 1, 2 and 3) were exposed at the exposure section 6 from the light-sensitive surface side by a laser scanning using an exposure device which uses as a light source, a semiconductor laser that has been has been set in longitudinal multiscanning mode and which has a wavelength of 800-820 nm in high frequency wave superposition. At this time, images are formed with the angle of the photothermographic dry imaging material 1, 2 and 3 (films 1, 2 and 3) and the exposure laser beam being 75 degrees. In this method, when compared with the case where the angle is 90 degrees, and the image obtained is less unevenness and the sharpness and the like is remarkably more favorable.

Subsequently, the light-insensitive surface of the dry imaging materials for photothermographic 1, 2 and 3 and the surface of the development section 3 are caused to come in contact with each other and thermal development processing is carried out at 123° C. for 15 seconds. It is to be noted that for film 3, thermal development is performed at a conveyance speed of 32 mm/second in the thermal development section.

The light-insensitive surface sides of the dry imaging materials 1, 2 and 3 that have undergone thermal processing are cooled by a cooling member in the cooling section 5, and FIG. 1(*a*) shows roll-like materials while FIG. 1(*b*) shows plate-like material. It is to be noted that operation of operation of the laser imager was performed at in a room with a temperature of 23° C. and humidity of 50% RH.

(Method for Measuring Cooling Rate)

The cooling rate was measured by uniformly attaching 10 thermocouples on the light-sensitive surface and the light-insensitive surface respectively of the imaging photothermographic material 1, 2 and 3. The temperature history of the surfaces were measured for the processes from thermal development to cooling and then discharge respectively until the temperature becomes 45° C.

(Method for Measuring Curl Value)

When the half-size of the imaging materials for photothermographic 1, 2 and 3 immediately before development are laid flat on a flat surface, the height of the rise of the curl is measured, and those for which the rise is at the light-sensitive layer side are indicated by+and those for which the rise is at the light-insensitive layer side are shown as –. A smaller absolute value is preferable for the curl value, and if the absolute value is 50 mm or greater, there is a problem in that this poses a hindrance for actual use.

(Development Unevenness)

The photothermographic imaging materials 1, 2 and 3 were subjected to exposure development processing using the laser imager shown in FIG. 1 such that density is 1.5 and the development unevenness was visually evaluated.

5: There was no development unevenness.

4: There was some amount of development unevenness, but this was not problematic in terms of diagnosis using the image.

3: There is development unevenness and diagnosis using the image is slightly hindered.

2: There is a large amount of image unevenness image diagnosis.

1: Image unevenness is strong and diagnosis using the image is not possible.

(Image Storage Stability)

The imaging materials for photothermographic 1, 2 and 3 were subjected to exposure development processing using the laser imager shown in FIG. 1 such that the density was 1.5, and then brought into contact with a viewing box (observation device) for 6 hours and 24 hours with the light-insensitive surface having a luminance of 3000 cd/$m^2$ and surface temperature of 35° C., and the amount of variation in density is measured. A lesser variation is more favorable.

As can be seen from FIG. 3, due this invention, an image is obtained in which image unevenness and curling does not occur, and even if there is substantial light-sensitivity after the thermal development processing, storage stability is excellent.

According to this invention, because the laser imager is more compact, and the length of the cooling section is short, image unevenness and curling does not occur even in cases where rapid cooling is necessary, and photothermographic dry imaging material which has excellent storage stability, as well as a processing method and development device thereof can be provided.

What is claimed is:

1. A development method for a sheet-shaped photothermographic material including a light-sensitive surface and a light-insensitive surface provided opposite to the light-sensitive surface, the development method comprising:

an exposure step for exposing the light-sensitive surface of the photothermographic material to form a latent image;

a developing step for heating to develop the latent image formed in the exposed photothermographic material; and a cooling step performed by direct contact of a cooling member with the light-insensitive surface of the photothermographic material after the developing step for cooling the photothermographic material under a condition that a cooling rate for the light-insensitive surface of the photothermographic material is 1.5-3.0 times as fast as a cooling rate for the light-sensitive surface of the photothermographic material and a cooling time is not more than 1.5 times for a time required for the developing step.

2. The development method of claim 1, wherein the cooling member is one selected from a metal plate, a metal roller, a non-woven fabric, and a flocked roller.

3. The development method of claim 1, wherein the conveyance rate is 30 mm/s to 60 mm/s in the development step.

4. The development method of claim 1, wherein the photothermographic material comprises a light-sensitive layer which includes silver halide grains and aliphatic silver carboxylate, and the aliphatic silver carboxylate includes silver behenate in a proportion of 80 mol % to 100 mol %.

5. The development method of claim 1, wherein the photothermographic material comprises a light sensitive layer

TABLE 3

| No. | Film | Length of cooling section/length of development section | Cooling rate proportion Light-insensitive surface/light-sensitive surface | Curl value (mm) | Development unevenness (rank) | Image storage stability (amount of density variation) After 6 hours | After 24 hours | Remarks |
|---|---|---|---|---|---|---|---|---|
| 1 | 1 | 3.0 | 0.5 | 60 | 3 | 0.005 | 0.01 | Comp. |
| 2 | 1 | 1.5 | 1.5 | 20 | 4 | 0.002 | 0.004 | Inv. |
| 3 | 1 | 1.0 | 2.0 | 10 | 5 | 0.002 | 0.003 | Inv. |
| 4 | 1 | 1.0 | 3.0 | 5 | 5 | 0.001 | 0.002 | Inv. |
| 5 | 1 | 0.5 | 3.0 | 5 | 4 | 0.001 | 0.002 | Inv. |
| 6 | 2 | 3.0 | 0.5 | 60 | 3 | 0.004 | 0.008 | Comp. |
| 7 | 2 | 1.0 | 3.0 | 10 | 4 | 0.002 | 0.004 | Inv. |
| 8 | 3 | 1.0 | 3.0 | 5 | 5 | 0.001 | 0.002 | Inv. |

Comp.: Comparison
Inv.: This invention which includes silver halide grains and a silver ion reducing agent, and the silver ion reducing agent is a compound represented by the general formula (RED)

General formula (RED)

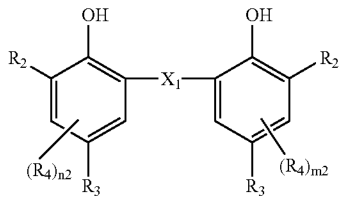

wherein $X_1$ represents a chalcogen atom or $CHR_1$, and $R_1$ represents a hydrogen atom, a halogen atom, an alkyl group, an alkenyl group, an aryl group or a heterocyclic group; $R_2$ represents an alkyl group; $R_3$ represents a group that is substitutable with a hydrogen atom or a benzene ring; and $R_4$ represents a group that is substitutable on a benzene ring, and m2 and n2 each represents an integer from 0-2.

6. The development method of claim 1, wherein the photothermographic material comprises a light sensitive layer which includes light-sensitive silver halide grains, and the light-sensitive silver halide grains are chemically sensitized by an organic sensitizer including a chalcogen atom.

7. The development method of claim 1, wherein the photothermographic material comprises a color image forming agent which increases absorbance of light of a wavelength 360-450 nm by being oxidized.

8. The development method of claim 1, wherein the photothermographic material comprises a color image forming agent which increases absorbance of light of a wavelength 600-700 nm by being oxidized.

9. The development method of claim 1, wherein the cooling member has a heat sink or a heat pipe for actively discharging heat.

10. A thermal development device for developing a sheet-shaped photothermographic material including a light-sensitive surface to be exposed to form a latent image and a light-sensitive surface provided opposite to the light-sensitive surface, the thermal development device comprising:

a conveyance section having a conveyance path and a conveying member to convey the photothermographic material on the conveyance path;

a thermal development section located along the conveyance path so as to form a development path on the conveyance path for heating to develop the latent image formed in the photothermographic material conveyed on the development path; and a cooling section located along the conveyance path so as to form a cooling path on the conveyance path after the development path and including a contact member arranged to come in contact with the light-insensitive surface of the photothermographic material conveyed on the cooling path and being operable to cool the photothermographic material under a condition that a cooling rate for the light-insensitive surface of the photothermographic material is 1.5-3.0 times as fast as a cooling rate for the light-sensitive surface of the photothermographic material; and wherein the length of the cooling path is not more than 1.5 times the length of the development path.

11. The thermal development device of claim 10, wherein the contact member is one selected from a metal plate, a metal roller, a non-woven fabric, and a flocked roller.

12. The thermal development device of claim 10, wherein the contact member has a heat sink or a heat pipe for actively discharging heat.

* * * * *